United States Patent
Mather et al.

(10) Patent No.: US 8,546,718 B2
(45) Date of Patent: Oct. 1, 2013

(54) ELECTRODE FOR A CONTACT START PLASMA ARC TORCH AND CONTACT START PLASMA ARC TORCH EMPLOYING SUCH ELECTRODES

(75) Inventors: Jonathan P. Mather, Cornish Flat, NH (US); Stephen T. Eickhoff, Hanover, NH (US); Jesse Roberts, Cornish, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 13/331,906

(22) Filed: Dec. 20, 2011

(65) Prior Publication Data

US 2012/0152912 A1    Jun. 21, 2012

Related U.S. Application Data

(63) Continuation of application No. 11/709,315, filed on Feb. 20, 2007, now Pat. No. 8,115,136.

(60) Provisional application No. 60/774,451, filed on Feb. 17, 2006.

(51) Int. Cl.
*B23K 10/00* (2006.01)
*H05H 1/34* (2006.01)

(52) U.S. Cl.
USPC .............. 219/121.4; 219/121.39; 219/121.44; 219/121.48; 219/121.45; 219/75

(58) Field of Classification Search
CPC .................................. B23K 10/00; H05H 1/34
USPC .............. 219/121.39, 121.44, 121.5, 121.51, 219/121.52, 121.48, 121.59, 121.36, 75
See application file for complete search history.

(56) References Cited

U.S. PATENT DOCUMENTS

| | | | |
|---|---|---|---|
| 3,207,881 A | 9/1965 | Pagan | |
| 3,210,586 A | 10/1965 | Clevett | |
| 3,242,305 A | 3/1966 | Kane et al. | |
| 4,791,268 A | 12/1988 | Sanders et al. | |
| 4,902,871 A | 2/1990 | Sanders et al. | |
| 5,796,067 A | 8/1998 | Enyedy et al. | |
| 5,897,795 A * | 4/1999 | Lu et al. | 219/121.57 |
| 5,994,663 A | 11/1999 | Lu | |
| 6,084,199 A | 7/2000 | Lindsay et al. | |
| 6,403,915 B1 | 6/2002 | Cook et al. | |
| 6,703,581 B2 | 3/2004 | Jones et al. | |
| 6,717,096 B2 | 4/2004 | Hewett et al. | |
| 6,903,301 B2 | 6/2005 | Jones et al. | |
| 6,946,616 B2 | 9/2005 | Kinerson et al. | |
| 7,202,440 B2 | 4/2007 | Hewett et al. | |
| 7,435,925 B2 | 10/2008 | Griffin | |

(Continued)

FOREIGN PATENT DOCUMENTS

| | | |
|---|---|---|
| JP | 3-106572 | 5/1991 |
| JP | 3-118980 | 5/1991 |

*Primary Examiner* — Mark Paschall
(74) *Attorney, Agent, or Firm* — Proskauer Rose LLP

(57) ABSTRACT

An electrode for a contact start plasma arc torch includes an elongated electrode body formed of an electrically conductive material. The electrode body is movable relative to the torch. A resilient element, contacting a proximal end of the electrode body, is used for imparting a separation force to the electrode body. The electrode body is adapted to overcome the separation force and engage a contact element of the torch when the torch is operated in a transferred arc mode.

34 Claims, 20 Drawing Sheets

(56) References Cited

U.S. PATENT DOCUMENTS

| | | |
|---|---|---|
| 8,258,423 B2 * | 9/2012 | Severance et al. ....... 219/121.48 |
| 2002/0117482 A1 | 8/2002 | Hewett et al. |
| 2002/0117483 A1 | 8/2002 | Jones et al. |
| 2002/0117484 A1 | 8/2002 | Jones et al. |
| 2004/0232118 A1 | 11/2004 | Horner-Richardson et al. |
| 2005/0082263 A1 | 4/2005 | Koike et al. |
| 2006/0037945 A1 | 2/2006 | Schneider |
| 2007/0210035 A1 | 9/2007 | Twarog et al. |
| 2008/0217305 A1 | 9/2008 | Sanders |

* cited by examiner

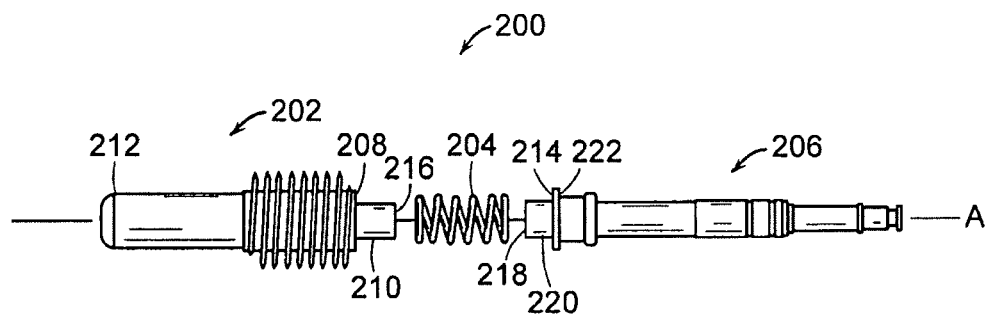
FIG. 2A
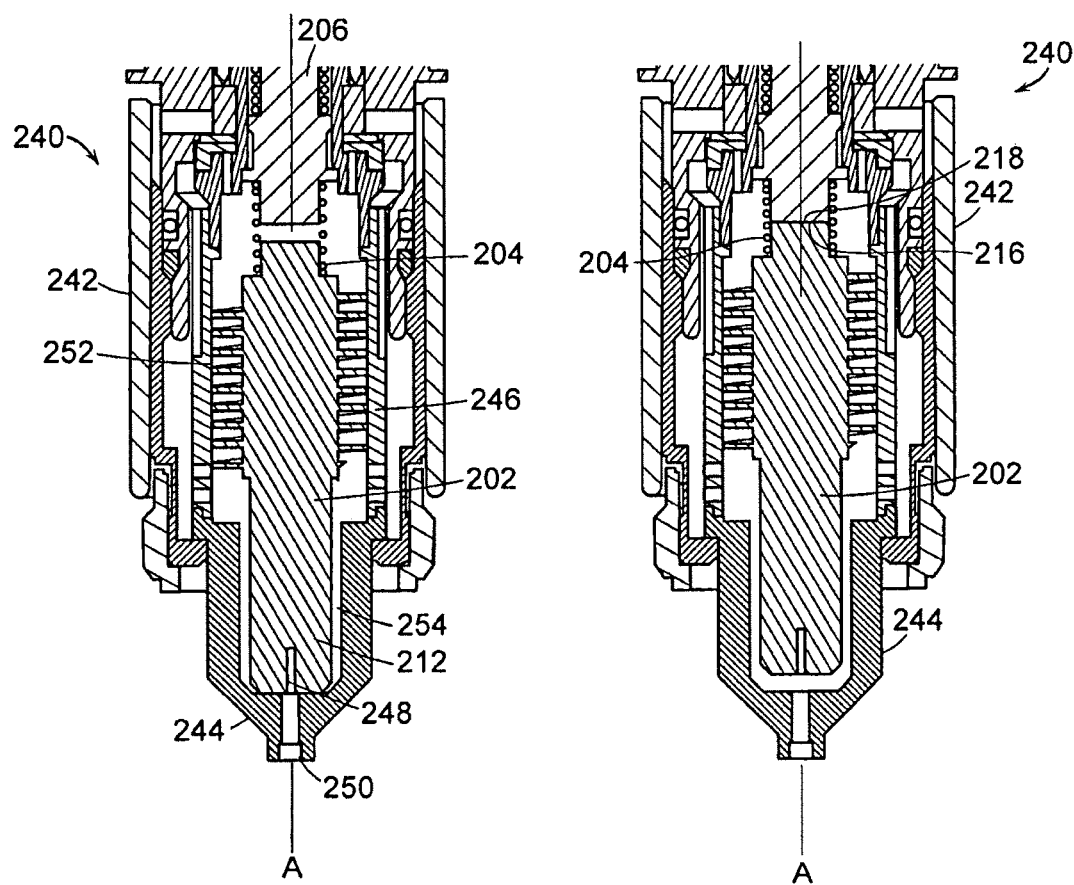
FIG. 2B
FIG. 2C

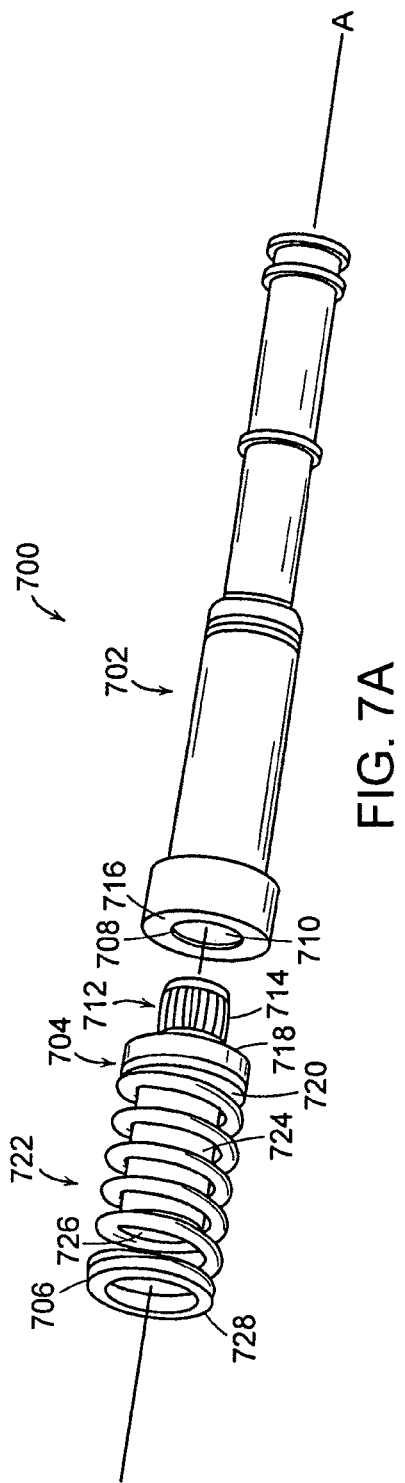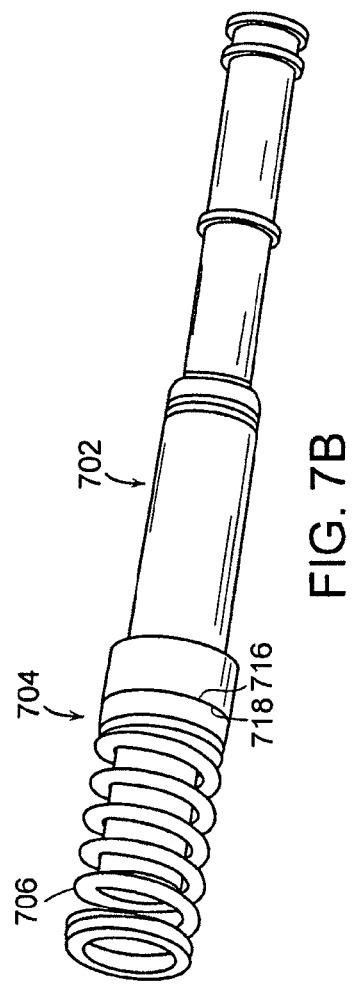
FIG. 7A
FIG. 7B

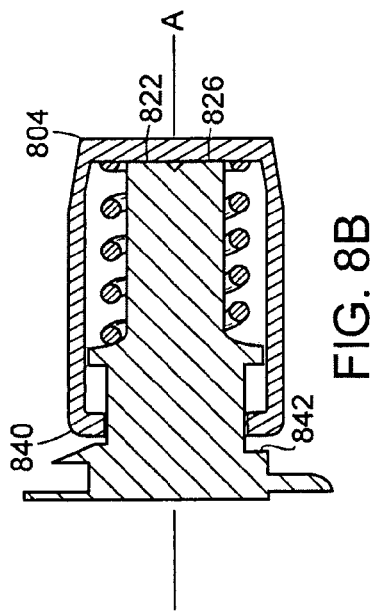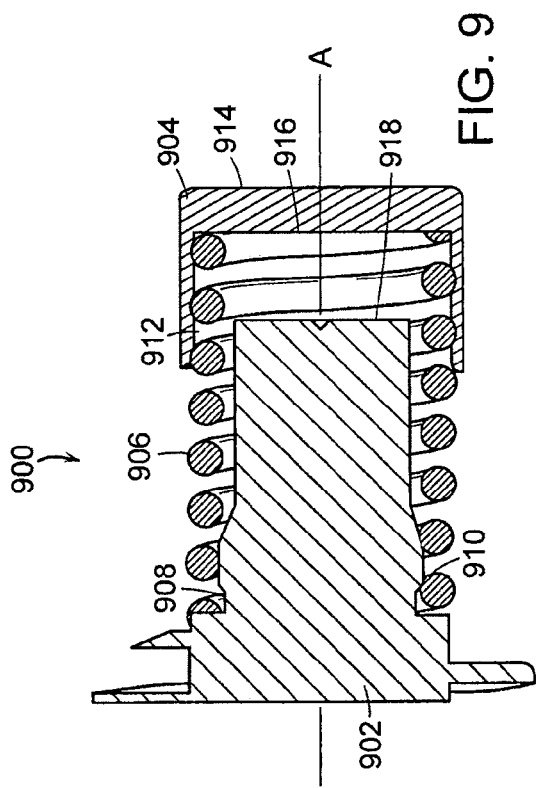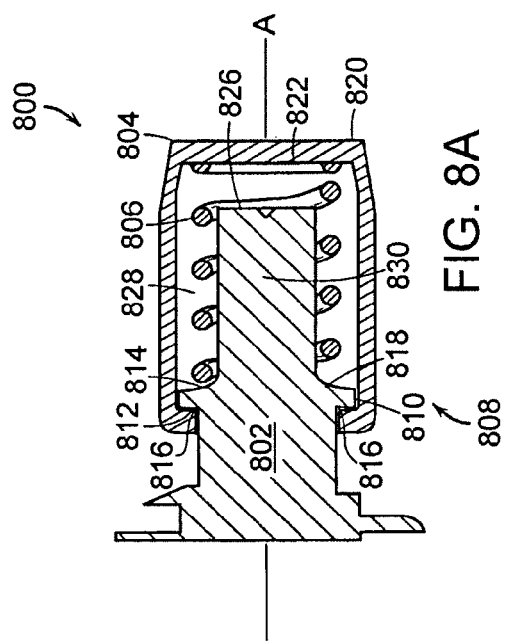

ELECTRODE FOR A CONTACT START PLASMA ARC TORCH AND CONTACT START PLASMA ARC TORCH EMPLOYING SUCH ELECTRODES

CROSS REFERENCE TO RELATED APPLICATIONS

This application claims the benefit of U.S. Provisional Patent Application No. 60/774,451, filed Feb. 17, 2006 and titled "Electrode for a Contact Start Plasma Arc Torch and Contact Start Plasma Arc Torch Employing Such Electrodes," the entirety of which is hereby incorporated by reference. This application is a continuation of U.S. Ser. No. 11/709,315, filed on Feb. 20, 2007 now U.S. Pat. No. 8,115,136, the entire contents of which are incorporated herein by reference.

TECHNICAL FIELD

The invention relates generally to plasma arc torches and more particularly to electrodes and torches for contact start plasma arc torch applications.

BACKGROUND

Material processing apparatus, such as plasma arc torches and lasers are widely used in the cutting and marking of metallic materials known as workpieces. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

One method for producing a plasma arc in a plasma arc torch is the contact start method. The contact start method involves establishing physical contact and electrical communication between the electrode and the nozzle to create a current path between them. The electrode and the nozzle can cooperate to create a plasma chamber within the torch body. An electrical current is provided to the electrode and the nozzle, and a gas is introduced to the plasma chamber. Gas pressure builds up until the pressure is sufficient to separate the electrode and the nozzle. The separation causes an arc to be formed between the electrode and the nozzle in the plasma chamber. The arc ionizes the introduced gas to produce a plasma jet that can be transferred to the workpiece for material processing. In some applications, the power supply is adapted to provide a first electrical current known as a pilot current during generation of the arc and a second current known as a transferred arc current when the plasma jet has been transferred to the workpiece.

Various configurations are possible for generating the arc. For example, the electrode can move within the torch body away from the stationary nozzle. Such a configuration is referred to as the "blow-back" contact start method because the gas pressure causes the electrode to move away from the workpiece. In another configuration, the nozzle can move away from the relatively stationary electrode. Such a configuration is referred to as the "blow-forward" contact start method because the gas pressure causes the nozzle to move toward the workpiece. In still another configuration, other torch components (e.g., the swirl ring) can be moved between the stationary electrode and nozzle.

Certain components of the material processing apparatus deteriorate over time from use. These "consumable" components include, in the case of a plasma arc torch, the electrode, swirl ring, nozzle, and shield. Furthermore, in the process of starting the torch using the contact start method, various consumable components can become misaligned, which reduces the useful life of the components as well as the accuracy and repeatability of plasma jet location. Ideally, these components are easily replaceable in the field. Nevertheless, replacing consumable components can result in down time and reduced productivity.

In the blow-back method of contact starting a plasma arc torch, the electrode is moved away from the nozzle to initiate a pilot arc between the electrode and the nozzle. A proximal end of the electrode (e.g., remote from the workpiece) engages a power contact that forms a part of the torch body. Movement of the electrode away from the nozzle also moves the power contact. Repeated use of the torch results in wear on both the power contact and on the electrode. Replacing the electrode is routine in plasma arc torch operation and the process is routinely performed. However, replacing the power contact involves disassembling the torch body and can be time-consuming and expensive because the power contact is not designed to be a consumable component. Some blow-back torches involve moving the power contact with respect to the relatively stationary torch body. Movement of such a power contact and the effectiveness of the torch can be affected by the stiffness or rigidity of the power cable that connects the power contact to the power supply.

For example, FIG. 1 is a cross section of a known contact start plasma arc torch. The system 100 includes a power supply (not shown) in electrical communication over a current-carrying cable 104 with a power contact 108 that provides current to the torch 112. The torch 112 includes a cathode block 116 electrically insulated from and surrounding the power contact 108. The power contact 108 abuts a proximal end 120 of an electrically conductive electrode 124. A spring 128 disposed within the cathode block 116 reacts against a surface 132 of the cathode block 116 to urge the power contact 108 and electrode 124 toward an electrically conductive nozzle 136. The electrode 124 is urged into contact with the nozzle 136 by the spring prior to initiation of an arc for processing a workpiece (not shown).

A current path is established from the cable 104 to the power contact 108, the electrode 124, and the nozzle 136. Electrical current can be passed along the current path. The electrode 124 cooperates with the nozzle 136 to form a portion of a plasma chamber 140. A plasma gas can be supplied to the plasma chamber 140 to increase pressure within the plasma chamber 140 and overcome the force provided by the spring 128. The pressure forces the electrode 124 and the power contact 108 away from the nozzle 136. A potential difference develops between the electrode 124 (e.g., the cathode) and the nozzle 136 (e.g., the anode) as the gap 144 between the electrode 124 and the nozzle 136 increases. An arc (not shown) ionizes gas particles and is initiated across the gap 144 for workpiece processing.

One drawback of the system 100 is that the power contact 108 is required to move as the electrode 124 moves to initiate an arc. As the current carrying capacity of the cable 104 increases, the size of the cable 104 increases, but the flexibility of the cable 104 decreases. The decreased flexibility of the cable 104 reduces the versatility and maneuverability of the torch 112. Additionally, the power contact 108 and the cathode block 116 require relatively tight tolerances (e.g., with relatively small clearance between the power contact 108 and the cathode block 116). The relatively tight tolerances position and guide the power contact 108 during motion of the power contact 108, for example, during initiation of a pilot arc.

SUMMARY

There is a need for an electrode for use in a contact start plasma arc torch that optimizes operation of the torch without prematurely failing. Further, there is a need for a contact start torch that employs the concepts herein to maximize component lifetime within existing torch designs. It is therefore an object of the invention to provide a longer-lasting electrode and components for use with an electrode in a plasma arc torch. Another object is to provide a configuration that reduces wear on components of the torch that are not designed as consumables. Yet another object is to provide aligning features with respect to torch components during torch operation (e.g., pilot arc and transferred arc mode).

In one aspect, an electrode for a plasma arc torch has a power connection in electrical communication with a power supply. The electrode includes an elongated electrode body formed of an electrically conductive material and defining a longitudinal axis. The electrode includes a resilient element for passing substantially all of a pilot arc current between the power supply and the electrode body during pilot arc operation of the plasma arc torch. The resilient element performs both electrical and mechanical functions and can be referred to as a dual-function element of the torch. The resilient element comprises an electrically conductive material to facilitate both carrying a pilot arc current and dissipating thermal heating associated with the pilot arc current to prevent the resilient element from melting during initiation of the pilot arc. The conductive material can be selected, for example, based on the current rating of the conductive material. The resilient element comprises the path of least resistance and/or highest conductance for carrying the pilot current between the power connection and the electrode body. Additionally, the mechanical properties of the resilient element facilitate movement of the electrode body for contact starting the plasma arc torch. In some embodiments, the resilient element aids in aligning the electrode body relative to the torch.

In some embodiments, the electrode body is longitudinally movable relative to the torch. In some embodiments, the electrode body includes a reaction surface disposed in a spaced relationship relative to a proximal end of the electrode body that is positioned remotely from a workpiece. The reaction surface is configured for electrical communication with the electrically conductive resilient element. In some embodiments, the reaction surface includes a radially extending flange formed integrally with the electrode body.

In some embodiments, the resilient element is secured relative to the electrode body. For example, the resilient element can be secured by a diametral interference fit or a friction fit. In some embodiments, the resilient element is disposed adjacent a distal end of the electrode body, and the distal end includes an emissive element. In some embodiments, the resilient element is formed integrally with the electrode body. In some embodiments, the pilot arc operation includes initiation of a pilot arc. In some embodiments, pilot arc operation includes initiation of a pilot arc and a duration of time after initiation of the pilot arc before the arc is transferred to the workpiece or before the torch is operated in transferred arc mode.

In some embodiments, the electrode further includes a hollow body for maintaining the resilient element and for slideably receiving the electrode body.

In another aspect, there is an electrode for a plasma arc torch. The electrode includes an elongated electrode body formed of an electrically conductive material defining a longitudinal axis and a distal end that includes an emissive element. The electrode body is movable relative to the torch. The electrode includes a contact element. The contact element includes a first surface for facilitating electrical communication with a power supply and a second surface for facilitating electrical communication with a corresponding contact surface of the electrode body when the torch is operated in a transferred arc mode. The second surface of the contact element is characterized by the absence of contact with the contact surface of the electrode body during initiation of a pilot arc.

The electrode body can be axially movable relative to the torch. In some embodiments, the second surface is configured for physical contact with the contact surface of the electrode body when the torch is operated in transferred arc mode. In some embodiments, the electrode body includes a reaction surface for contact with a conductive resilient element and disposed in a spaced relationship relative to a proximal end of the electrode body. The proximal end is disposed remotely from the distal end that includes the emissive element. The reaction surface can be defined by a radially extending flange formed integrally with the electrode body.

In some embodiments, the electrode includes an electrically conductive resilient element in electrical communication with at least one of the contact element or the electrode body. The resilient element can be formed integrally with at least one of the electrode body or the contact element. In some embodiments, the resilient element is disposed adjacent a distal end of the electrode body. The resilient element can be retained by the electrode body. In some embodiments, the electrode body includes a reaction surface formed integrally with the electrode body. The resilient element can be disposed between the reaction surface and the second surface of the contact element.

In some embodiments, the resilient element is configured to pass substantially all of a pilot arc current between the power supply and the electrode body during pilot arc operation. The resilient element can include at least one of a spring or a wire. In some embodiments, at least a portion of the contact element slideably engages the electrode body. In some embodiments, a portion of the contact element can facilitate passage of a pilot arc current between the contact element and the electrode body when the contact element slideably engages the electrode body. The contact element can be retained by the electrode body. In some embodiments, the contact element includes a connective member that defines an aligning surface for restraining radial movement of the electrode body. The connective member can be formed integrally with the contact element. In some embodiments, the electrode body includes a receptacle disposed adjacent a proximal end of the electrode body that is remote from a workpiece. The receptacle can be configured to hinder disengagement of the contact element from the electrode body.

In another aspect, there is a contact element for conducting current between a power supply and a torch electrode slideably mounted within a torch body of a contact start plasma arc torch. The contact element includes a first surface for facilitating electrical communication with the power supply and a second surface for electrical communication with a contact surface defined by a proximal end of the torch electrode. When the torch electrode is in physical contact with the second surface, at least a portion of a transferred arc current passes through the contact element and between the power supply and the torch electrode for operating the torch in a transferred arc mode. The contact element includes an electrically conductive resilient element disposed adjacent the electrode body for passing substantially all of a pilot arc current from the power supply to the electrode body during a pilot arc operation.

In some embodiments, a connective member extends from the second surface to slideably engage the electrode body. The connective member can be formed integrally with the second surface. In some embodiments, the connective member includes a third surface configured to pass a portion of the transferred arc current between the power supply and the electrode body when the torch is operated in transferred arc mode. In some embodiments, the contact element includes a receptacle portion for surrounding a portion of a proximal end of the electrode body. The resilient element can be disposed within the receptacle portion of the contact element. In some embodiments, at least one of the first surface or the second surface defines an annular surface.

In some embodiments, the contact element includes a third surface for electrical communication with the power supply and for passing a portion of a transferred arc current between the power supply and the electrode body when the torch is operated in a transferred arc mode. In some embodiments, the contact element includes an aligning portion defining an axis. The aligning portion is disposed in a spaced relationship with a proximal end of the electrode body and is configured to restrain radial movement of the electrode body.

In another aspect, an electrode for a plasma arc torch is featured. The electrode includes an elongated electrode body formed of an electrically conductive material and defining a longitudinal axis. The electrode body includes a distal end defining a bore for receiving an emissive element and a proximal end defining a contact surface for electrical communication with a power supply. The electrode body includes a receptacle disposed within the proximal end of the electrode body configured to receive at least a portion of a contact element. A first portion of the contact element is physically remote from the electrode body during initiation of a pilot arc, and the first portion of the contact element is for passing substantially all of a transferred arc current between a power supply and the electrode body when the torch is operated in transferred arc mode. The bore and the receptacle are separated by the electrode body.

In some embodiments, at least a portion of the contact surface is disposed within the receptacle. The contact element can include an annular configuration. In some embodiments, the receptacle includes a cylindrical portion and a restraint surface disposed at a proximal end of the receptacle for reacting against a portion of the contact element to hinder disengagement of the contact element from the receptacle. The restraint surface can be an annular configuration.

In some embodiments, the cylindrical portion is defined by a first diameter, the restraint surface includes a second diameter, and a distal region of a connective member of the contact element defines a third diameter such that the third diameter is greater than the second diameter and less than the first diameter. The distal region can be a distal end of the connective member. In some embodiments, the receptacle includes a surface radially dimensioned along an axis of the receptacle for restraining radial movement of the electrode body. The radially-dimensioned surface is for physical contact with the portion of the contact element received by the receptacle.

In some embodiments, the electrode body includes a reaction surface disposed in a spaced relationship relative to the contact surface. The reaction surface can be a radially extending flange formed integrally with the electrode body. In some embodiments, the electrode includes an electrically conductive resilient element that is retained by the electrode body. The reaction surface can be for contact with the resilient conductive element. The resilient element can be retained by a diametral interference fit. The resilient element can be disposed with the receptacle.

In another aspect, a contact element for conducting current between a power supply and an electrode body slideably mounted with a torch body of a contact start plasma arc torch is provided. The electrode body includes a distal end that includes an emissive element. The contact element includes a first surface for facilitating electrical communication with the power supply and a second surface for facilitating electrical communication with the proximal end of the electrode body. The second surface is not in contact with the proximal end during initiation of a pilot arc and is in contact with the proximal end during a transferred arc mode such that at least a portion of a transferred arc current from the power supply passes between the first and second surfaces of the contact element to the electrode body when the torch is operated in the transferred arc mode.

In some embodiments, the contact element includes an electrically conductive resilient element disposed adjacent the electrode body. The resilient element is for passing substantially all of a pilot arc current between the power supply and the electrode body during pilot arc initiation. The contact element can include a connective member disposed between the second surface and the electrode body. In some embodiments, the connective member is formed integrally with the second surface. In some embodiments, the connective member defines an axis and an aligning surface in a spaced relationship with the proximal end for restraining radial movement of the electrode body. In some embodiments, the first surface, the second surface, or both define an annular surface.

The contact element can include a swirl ring portion. In some embodiments, the contact element is formed integrally with the swirl ring portion. The swirl ring portion can impart radial motion to a gas flowing through the plasma arc torch. The swirl ring portion can also insulate the electrode body from the nozzle and direct the gas towards a portion of the electrode body defining a plurality of fins. The swirl ring portion can also restrain radial movement of the electrode body in the torch. In some embodiments, the swirl ring portion can perform all of these functions. In some embodiments, the swirl ring portion performs one or more of these functions. The functions not performed by the swirl ring portion can be performed by one or more discrete components.

In another aspect, a plasma arc torch is provided. The plasma arc torch includes a power supply for providing current to the torch. The torch includes a plasma chamber defined by a nozzle and an electrically conductive electrode body slideably mounted within the torch along an axis defined by a proximal end of the electrode body and a distal end of the electrode body. The proximal end defines a contact surface, and the distal end is disposed adjacent an exit orifice of the nozzle. The torch includes a power contact disposed in a stationary position relative to the plasma chamber. The power contact is in electrical communication with the power supply. The torch includes a resilient conductive element for passing substantially all of a pilot arc current between the power contact and the contact surface of the electrode body during pilot arc operation. The torch includes a contact element. The contact element includes a first surface in electrical communication with the power contact and a second surface for electrical communication with a corresponding contact surface of the electrode body. The contact element is capable of passing a transferred arc current between the power supply and the electrode body during transferred arc mode.

In some embodiments, the resilient conductive element biases the electrode body toward the nozzle. In some embodiments, the contact element is disposed in a stationary position relative to the electrode body. The contact element can be formed integrally with the power contact. In some embodiments, the torch includes a shield defining an exit port positioned adjacent an exit orifice of the nozzle. The shield can be mounted on a retaining cap that is supported on a torch body of the plasma arc torch. In some embodiments, the torch includes a swirl ring that imparts radial motion to gas flowing through the torch.

In another aspect, a plasma arc torch is provided. The plasma arc torch includes a power supply for providing current to the torch. The torch includes a plasma chamber defined by a nozzle and an electrically conductive electrode body slideably mounted within the torch along an axis defined by a proximal end of the electrode body and a distal end of the electrode body. The electrode body defines a contact surface, and the distal end is disposed adjacent an exit orifice of the nozzle. The torch includes a power contact disposed in a stationary position relative to a plasma chamber and is in electrical communication with the power supply. The torch includes a resilient conductive element for passing substantially all of a pilot arc current between the power contact and the contact surface of the electrode body during pilot arc operation of the plasma arc torch. The resilient conductive element biases the electrode body toward the nozzle.

In some embodiments, the power contact includes a first surface for facilitating physical contact and electrical communication with a corresponding second contact surface of the electrode body when the torch is operated in a transferred arc mode. The first surface of the power contact is characterized by the absence of contact with the corresponding second contact surface of the electrode body during initiation of a pilot arc.

In another aspect, there is an electrode for a plasma arc torch in electrical communication with a power supply. The electrode includes an elongated electrode body formed of an electrically conductive material and defining a longitudinal axis. The electrode body includes a first surface for electrical communication with a first conductive element for facilitating passage of a pilot arc current between the power supply and the electrode body during initiation of a pilot arc. The electrode body also includes a second surface positioned remotely from the first surface. The second surface is capable of physical contact and electrical communication with a corresponding surface of a power contact for facilitating passage of substantially all of a transferred arc current between the power supply and the electrode body during transferred arc operation. The second surface of the electrode body is characterized by the absence of contact with the corresponding surface of the power contact during initiation of the pilot arc.

In some embodiments, the electrode body is longitudinally movable relative to the torch. Although the embodiments described herein primarily relate to longitudinal movement of the electrode body within the torch, some embodiments feature an electrode body that is movable in a direction other than longitudinal along an axis. For example, the electrode body can move in a direction transverse to a longitudinal axis during initiation of a pilot arc or other torch operation. The electrode body can also move rotationally about the axis. In some embodiments, other movement of the electrode body occurs that is a combination of longitudinal, transverse, or rotational motion (e.g., a twisting or bending motion).

In another aspect, a plasma torch component for receiving an electrode is provided. The component includes an elongated hollow body and an electrically conductive resilient member for facilitating electrical communication of a pilot arc. The elongated hollow body has a first end and a second end. The elongated hollow body includes (a) an interior surface, (b) one or more of a contour, step, or flange located on the interior surface and disposed between the first end and the second end of the hollow body, the one or more of the contour, step or flange defining a shaped opening adapted for slideably receiving a complementary-shaped portion of the electrode, (c) a first opening in the first end of the hollow body sized to receive an electrical contact element, and (d) a second opening in the second end of the hollow body sized to slideably receive the electrode. The electrically conductive resilient member is disposed within the hollow body, such that the resilient member is at least partially maintained within the hollow body by the one or more of the contour, step, or flange, and wherein the resilient member aligns with the first opening.

In some embodiments, the hollow body of the component further includes a plurality of holes adjacent to the second opening of the hollow body for imparting a swirling flow on a gas. An embodiment also includes a contact element disposed in the first end of the hollow body. In this embodiment, the contact element maintains the resilient member within the hollow body and facilitates electrical coupling between the resilient member and a power supply.

In another aspect, an electrode for a contact start plasma arc torch is provided. The electrode includes an elongated electrode body made of an electrically conductive material and a second end positioned adjacent to the electrode body. The electrode body defines a longitudinal axis and a distal end for housing an emissive element. The second end defines an axially extensive portion having a first length along a first direction and a second length along a second direction. The second length of the axially extensive portion being greater than the first length.

In some embodiments, the first direction and the second direction of the axially extensive portion define a surface orthogonal to the longitudinal axis. In certain embodiments, the first and second directions are perpendicular. The electrode can include two or more axially extensive portions, each respective axially extensive portion having a respective first length and a respective second length greater than the respective first length. In certain embodiments, the two or more axially extensive portions are disposed in an equiangular configuration about the axis. A value for the operating current for transferred arc operation of the plasma arc torch can be associated with the number of the two or more axially extensive portions. That is, a specific operating current can correspond to a specific number of axially extensive portions located on the electrode body.

In some embodiments, the first direction and the second direction of the axially extensive portion extend radially away from the axis. In one embodiment, the first and second directions define a surface that includes a first region and a second region. The first region is in electrical communication with a resilient element for passing substantially all of a pilot arc current therebetween during pilot arc initiation. The second region is moved into physical contact and electrical communication with a power contact for transferred arc operation. In certain embodiments, the power contact is in electrical communication with a power supply. The power contact includes a first contact surface for physical contact and electrical communication with the second region and a second contact surface for electrical communication with the resilient member.

In some embodiments, the second end and the electrode body are integrally formed. In certain embodiments, the electrode further includes a swirl ring defining an interior surface disposed relative to a shoulder. The shoulder defines a complementary contoured perimeter to facilitate passage of the second length therethrough when the second length and the complementary contoured perimeter are aligned. In certain embodiments, the shoulder resists passage of the axially extensive portion therethrough when the second length and the complementary contoured portion are not aligned. The complementary contoured perimeter can define a third length greater than the second length. In some embodiments, the second length of the axially extensive portion is substantially equal to a width of the electrode body.

In another aspect, a swirl ring for a contact start plasma arc torch is provided. The swirl ring includes (a) a hollow body formed of an insulative material along a longitudinal axis and defining an exterior surface and an interior surface, (b) one or more gas passageways extending from the exterior surface to the interior surface, and (c) a shoulder portion disposed relative to the interior surface and defining a contoured opening capable of receiving a complementary-shaped portion of an electrode body.

In some embodiments of this aspect, the shoulder portion permits the complementary-shaped portion of the electrode body to pass therethrough when the contoured opening and the complementary-shaped portion are aligned. In certain embodiments, the shoulder portion resists passage therethrough of the complementary-shaped portion of the electrode body when the contoured opening and the complementary-shaped portion are not aligned. The shoulder portion can include a reaction portion to limit an angular displacement of the electrode body. In one embodiment, the contoured opening defines an inner diameter and an outer diameter. The swirl ring can also include two or more portions in the contoured-opening disposed in an equiangular configuration about the axis, the two or more portions defined by the outer diameter of the contoured opening.

In another aspect, a component for a contact start plasma arc torch is provided. The component includes a hollow body defining a longitudinal axis and an interior surface of the body. The interior surface of body includes one or more of a contour, step, or flange defining a shaped opening capable of slideably receiving along the axis a complementary-shaped portion of an electrode body. The shaped opening has a first length along a first direction and a second length along a second direction. The second length is greater than the first length.

In some embodiments, the component further includes a swirl ring portion defining an exterior portion, an interior portion and one or more holes passing from the exterior portion to the interior portion for imparting a swirling motion to a fluid. The swirl ring portion can be formed integrally with the hollow body. In some embodiments, the contour, step or flange contacts a corresponding surface of a resilient element to hinder removal of the resilient element from the torch.

In another aspect, an electrode for a contact start plasma arc torch is provided. The electrode includes an elongated electrode body and a second end positioned adjacent to the electrode body. The elongated electrode body is made of an electrically conductive material and defines a longitudinal axis and a distal end for housing an emissive element. The second end defines a first surface having a first diameter centered about the longitudinal axis and one or more regions proximally extending from the first surface. Each one of the one or more regions has a portion shaped to provide physical contact and electrical communication with a resilient conductive element to facilitate flow of a pilot current.

In some embodiments of this aspect, the first surface of the second end of the electrode is moved into physical contact and electrical communication with a corresponding surface of a power contact to facilitate passage of a transferred arc current. In certain embodiments, the electrode further includes a second surface positioned relative to the first surface. The second surface is moved into physical contact and electrical communication with a corresponding surface of a power contact to facilitate passage of a transferred arc current. In some embodiments, the second surface is parallel to the first surface and positioned distally relative to the first surface or positioned proximally relative to the first surface.

In some embodiments, the one or more regions proximally extending from the first surface of the second end are substantially parallel to the longitudinal axis. Each of the one or more regions can define a second diameter smaller than the first diameter. In some embodiments, each of the one or more regions are diametrally disposed equidistant from the longitudinal axis.

In another aspect, an electrode for a contact start arc torch is provided. The electrode includes an elongated body made of an electrically conductive material and defining a longitudinal axis and a distal end for housing an emissive element and a second end positioned adjacent the electrode body. The second end includes a means for slideably engaging an interior surface of a component of the plasma arc torch along the axis, a means for electrical communication with a resilient element during pilot arc initiation to facilitate flow of a pilot current therebetween, and a means for electrical communication upon movement into physical contact with a power contact during transferred arc operation.

In another aspect, an electrode for a contact start plasma arc torch is provided. The electrode includes (a) an elongated electrode body made of an electrically conductive material and defining an electrode width, the elongated body is slidably attachable to an adjacent member, (b) a distal end of the electrode body, (c) an emissive element located at the distal end of the electrode body, (d) a second end of the electrode body having a surface for receiving an operational current, and (e) a radial extensive portion located at a position between the distal end and the second end of the electrode body. The radial extensive portion has a surface for receiving a pilot arc current. The radial extensive portion has a first portion with a first length and a second portion with a second length. The second length is greater than the electrode width and the first length.

In other embodiments of the invention, any of the aspects above can include one or more of the above features. One embodiment of the invention can provide all of the above features and advantages. These and other features will be more fully understood by reference to the following description and drawings, which are illustrative and not necessarily to scale.

BRIEF DESCRIPTION OF THE DRAWINGS

FIG. 2A is an exploded view of an electrode body, a conductive resilient element, and a power contact, featured in embodiments of the invention.

FIG. 2B illustrates a cross section of an exemplary contact start plasma arc torch employing the components of FIG. 2A prior to pilot arc operation.

FIG. 2C illustrates a cross section of the plasma arc torch of FIG. 2B during transferred arc mode.

FIG. 7A depicts a partially exploded view of an exemplary contact element, resilient element, and power contact that embody principles of the invention.

FIG. 7B depicts the components of FIG. 7A disposed in a plasma arc torch operation.

FIG. 8A depicts a cross section of another embodiment of an electrode body, resilient conductive element, and contact element prior to installation within a plasma arc torch.

FIG. 8B illustrates the configuration of the components of FIG. 8A during transferred arc mode.

FIG. 9 depicts a cross section of another embodiment of an electrode that embodies the invention.

DETAILED DESCRIPTION

Figure 1:
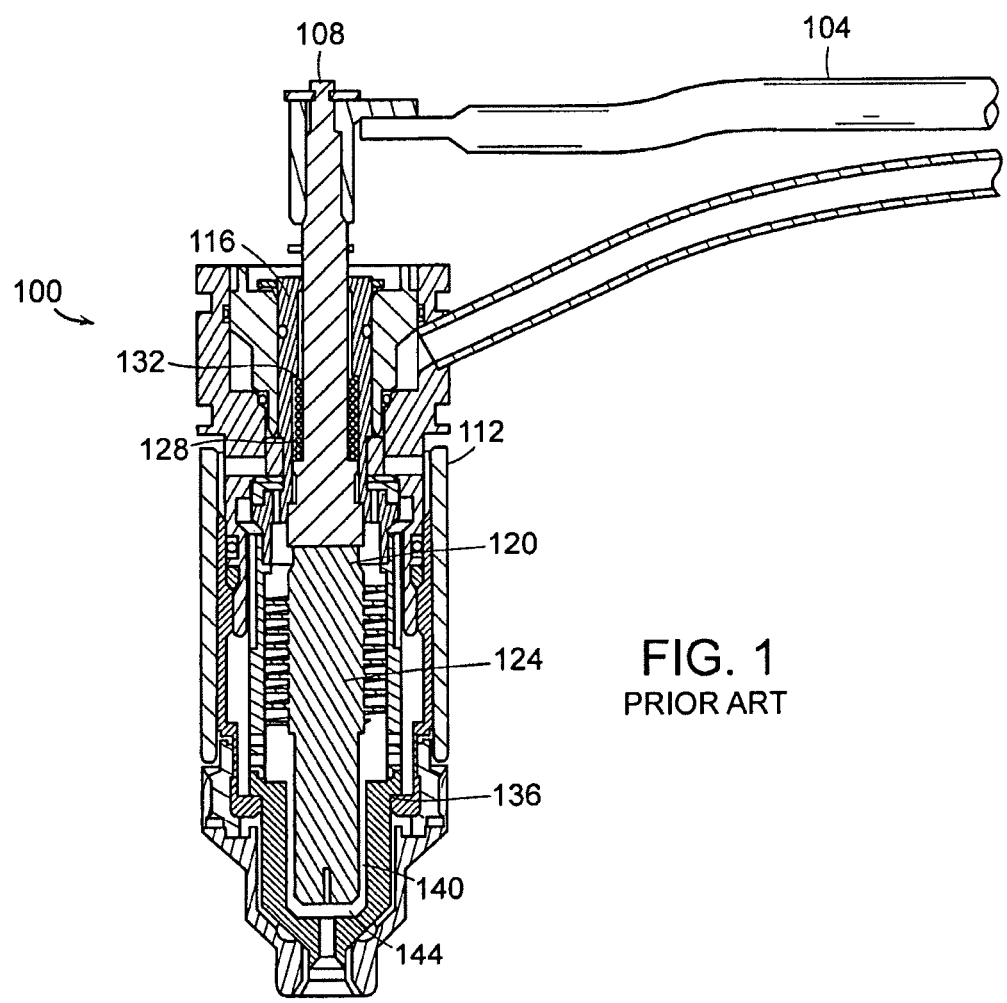
FIG. 1 is a cross section of a known contact start plasma arc torch.

FIG. 2A is an exploded view of an electrode body, a conductive resilient element, and a power contact, featured in embodiments of the invention. The system 200 includes an electrode body 202, a resilient conductive element 204, and a power contact 206 (also referred to as a power connection). The power contact 206 is in electrical communication with a power supply (not shown), for example, by a power cable (e.g., the power cable 104 of FIG. 1). The power supply provides to the power contact 206 the electrical current used to operate a plasma arc torch, similar to the torch 112 of FIG. 1. The electrode body 202 includes a reaction surface 208 that is configured for electrical communication with the resilient conductive element 204. The reaction surface 208 is disposed in a spaced relationship with a proximal end 210 of the electrode body 202. In some embodiments, the reaction surface 208 defines a flange extending radially from the longitudinal axis A. In some embodiments, the reaction surface 208 is formed integrally with the electrode body 202. For example, the reaction surface 208 can be fabricated from the same material as the electrode body 202 or fabricated from a different material but bonded or secured to the electrode body 202.

The proximal end 210 of the electrode body 202 is disposed oppositely from the distal end 212. In the illustrated embodiment, the diameter of the distal end 212 is greater than the diameter of the proximal end 210 to allow the resilient conductive element 204 to surround the proximal end 210 when installed in the torch. Stated differently, the diameter of the proximal end 210 is less than the inside diameter of the resilient conductive element 204. In other embodiments, the proximal end 210 has a diameter equal to or greater than that of the distal end 212.

The power contact 206 includes a surface 214 for reacting against the resilient conductive element 204. The resilient conductive element 204 reacts against the relatively stationary surface 214 and against the reaction surface 208 of the relatively moveable electrode body 202 to bias the electrode body away from the power contact 206 during pilot arc operation. The electrode body 202 defines a contact surface 216 that is configured for physical contact and electrical communication with a corresponding surface 218 of the power contact 206. During the latter portion of pilot arc operation and during transferred arc mode, the contact surface 216 is in an abutting relationship with the corresponding surface 218. The portion 220 of the power contact 206 adjacent the surface 218 and extending to the surface 214 defines a diameter such that the resilient conductive element 204 surrounds the portion 220.

In some embodiments, the power contact 206 can be fabricated as a part of the power contact 108 of FIG. 1 (e.g., by machining the power contact 108 to include the features of the power contact 206). Such embodiments allow a user to employ the concepts described with respect to FIG. 2A in the existing torch system 112 of FIG. 1. In some embodiments, the power contact 108 can be positioned in the blown-back position of FIG. 1 by machining a groove in the power contact 108 and securing the power contact 108 with respect to the torch 112 with a clip or a retaining ring (not shown). In this way, the power contact 108 remains stationary relative to the torch 112 during both pilot arc operation and transferred arc operation. In general, any of the embodiments described herein can be used with the torch system 112 of FIG. 1 by modifying the power contact 108 in accord with the principles described herein.

The relatively stationary power contact 108 requires less flexibility from the power cable. An exemplary current suitable for use as a pilot arc current is between about 10 and about 31 amps. The electrical current during transferred arc operation can be up to about 200 amps. However, electrical currents greater than about 200 amps are within the scope of the invention, e.g., 400 amps. In some embodiments, the power contact 108 is fabricated from tellurium copper, brass, copper, or other materials suitable for passing current both during pilot arc operation and transferred arc operation.

In general, pilot arc operation refers to a duration of time between the provision of electric current to the electrode body 202 and the transfer of the plasma arc to the workpiece. More specifically, pilot arc operation can include initiation of the pilot arc and some duration of time after initiation of the pilot arc but prior to the transfer of the arc to the workpiece. Some torch designs include a safety mechanism to terminate pilot arc operation after a predetermined amount of time irrespective of whether the plasma arc has been transferred to the workpiece. Such mechanisms are designed to prolong the operational life of torch components and promote safety by limiting the amount of time the torch is operated without a specific application (e.g., processing a workpiece).

In some embodiments, the resilient conductive element 204 is secured to either the electrode body 202 or the power contact 206. In other embodiments, the resilient conductive element 204 is secured to both the electrode body 202 and the power contact 206. For example, the resilient conductive element 204 can be secured by welding, soldering, bonding, or otherwise fastening to the electrode body 202 or the power contact 206. In some embodiments, the resilient conductive element 204 is secured to the proximal end 208 of the electrode body 202 by a diametral interference fit or other type of friction fit. For example, an outer diameter of the proximal end 208 of the electrode body may be slightly larger than an inner diameter of the resilient conductive element 204. In some embodiments, the proximal end 208 of the electrode body 202 features an extension portion (not shown) having an inner diameter that is smaller than the inner diameter of the resilient conductive element 204. The extension portion can be formed integrally with electrode body 202 or otherwise secured to the electrode body 202. Such a configuration permits the electrode body 124 of FIG. 1 to be used, for example, in the torch 240 of FIG. 2B.

In some embodiments, the portion 220 of the power contact 206 is tapered or in a frustoconical shape along the longitudinal axis A. In some embodiments, the electrode body 202 can include a radially extensive shoulder (not shown) having a diameter that is greater than the inside diameter of the resilient conductive element 204 such that advancing the resilient conductive element toward the distal end 212 of the electrode body 202 past (e.g., over) the radially extensive shoulder hinders the resilient conductive element 204 from disengaging the electrode body 202 axially towards the proximal end 210.

In some embodiments, a distal face (not shown) of the shoulder is the reaction surface of the electrode body 202. A similar diametral interference fit can be used with respect to the power contact 206. For example, the resilient conductive element 204 can be advanced axially away from the electrode body 202 past the surface 214 of the power contact such that the face 222 of the surface 214 opposite the portion 220 hinders disengagement of the resilient conductive element 204 from the power contact. In some embodiments, the interface between the face 222 and the resilient conductive element 204 establishes a current path from the power contact 206.

In some embodiments, the resilient conductive element 204 is disposed in a spaced relationship with the distal end 212 of the electrode body 202 instead of the proximal end 210. The distal end 212 generally includes an emissive element (not shown) such as hafnium for more efficient plasma arc generation and workpiece processing. In some embodiments, the resilient conductive element 204 is formed integrally with the electrode body 202 or the power contact 206. For example, the resilient conductive element 204 can be formed from the same material as the electrode body 202. In other embodiments, the resilient conductive element 204 is bonded or secured to the electrode body 202 to hinder disengagement from the electrode body 202 under normal operational conditions (e.g., gas pressure and/or the influence of gravitational or other forces).

FIG. 2B illustrates a cross section of an exemplary contact start plasma arc torch employing the components and concepts of FIG. 2A. The configuration of FIG. 2B illustrates the torch 240 prior to pilot arc operation. The torch 240 includes the electrode body 202, the resilient conductive element 204, and the power contact 206 of FIG. 2A, mounted within a torch body 242. A nozzle 244 and a swirl ring 246 are also mounted to the torch body 242. The power contact 206 is positioned relatively stationary with respect to the moveable electrode body 202. The power contact 206 is positioned oppositely from the distal end 212 of the electrode body 202 (e.g., at the back end of the torch 240). The distal end 212 of the electrode body 202 includes an emissive element 248 substantially aligned with an exit orifice 250 of the nozzle 244. In some embodiments, the emissive element 248 and the exit orifice 250 are substantially centered about the longitudinal axis A. The swirl ring 246 is positioned to in part restrain radial motion of the electrode body 202 within the torch body 242. For example, the swirl ring 246 can be manufactured to permit a relatively small gap between the swirl ring 246 and one or more radial fins 252 of the electrode body 202.

The resilient conductive element 204 reacts against the reaction surface 208 of the electrode body 202 and against the surface 214 of the power contact 206 to urge the electrode body 202 into abutting relation with the nozzle 244. Gas flows into a plasma chamber 254 formed between the electrode body 202 and the nozzle 244, and a pilot current is passed from the power supply (not shown) to the power contact 206.

Gas pressure builds within the plasma chamber 254 until the pressure is sufficient to overcome the force provided by the resilient conductive element 204. The gas pressure moves the electrode body 202 away from the nozzle 244 and into an abutting relationship with the power contact 206. The electrode body 202 moves substantially along the longitudinal axis A. As the electrode body 202 is moved away from the nozzle 244 by gas pressure, an arc is generated or initiated in the plasma chamber 254. The arc ionizes the gas within the plasma chamber 254 to form a plasma arc or jet that exits the orifice 250 of the nozzle 244 and is transferred to the workpiece (not shown).

The resilient conductive element 204 is configured or designed to pass substantially all of the pilot current between the power contact 206 and the electrode body 202. The resilient conductive element 204 can be formed from a material that facilitates both carrying the electrical current or load associated with initiating a pilot arc and dissipating thermal heat associated with the current to prevent the resilient conductive element from melting during pilot arc operation. In some embodiments, the material of the resilient conductive element 204 is selected, for example, based on the current rating of the material. In some embodiments, the resilient conductive element 204 is the path of least resistance and/or highest conductance between the power contact 206 and the electrode body 202. Additionally, the mechanical properties of the resilient conductive element 206 facilitate movement of the electrode body for contact starting the plasma arc torch. In some embodiments, the resilient element aids in aligning the electrode body relative to the torch.

The resilient conductive element 204 can be an electrically conductive spring capable of reliably conducting about 31 amps of electric current for up to about 5 seconds or longer for pilot arc operation without melting or otherwise changing the mechanical properties of the spring. In some embodiments, the resilient conductive element 204 is fabricated from an alloy of Inconel® X-750. In some embodiments, the resilient conductive element 204 is fabricated from stainless steel. For example, the resilient conductive element 204 can be formed of 17/4 precipitation hardening stainless steel wire (conforming to AMS 5604 specifications) or Type 302 stainless steel wire (conforming to AMS 5866 or ASTM A 313 specifications). In some embodiments, the resilient conductive element 204 is formed from a wire of diameter about 0.762 mm (about 0.03 inches) and defines an outside diameter of about 7.62 mm (about 0.3 inches) $^{300}/_{1000}$ and a length along the longitudinal axis A of about 12.7 mm (e.g., about 0.5 inches).

In some embodiments, the resilient conductive element 204 is coated or plated with silver or a silver alloy to reduce electrical resistance and/or improve electrical conductance. While depicted herein as a helical compression spring, the resilient conductive element 204 can include other configurations, for example, a wave spring washer, a finger spring washer, curved spring washer, flat wire compression spring of the crest-to-crest variety, or a slotted conical disk. For example, these types of springs are illustrated in U.S. Pat. No. 5,994,663 assigned to Hypertherm, Inc., of Hanover, N.H., the contents of which are hereby incorporated herein by reference. Other spring configurations are also within the scope of the invention.

In some embodiments, the resilient conductive element 204 is a wire disposed at the proximal end 210 of the electrode body 202, and a second resilient element (not shown) is disposed at the distal end 212 of the electrode body 202. The second resilient element biases the electrode body toward the distal end 204 during pilot arc operation and restrains radial motion of the electrode body 202 during torch operation (e.g., during pilot arc operation and during workpiece processing). In this way, the second resilient element aligns the electrode body 202 during torch operation.

FIG. 2C illustrates a cross section of the plasma arc torch of FIG. 2B during transferred arc mode. The contact surface 216 of the electrode body 202 engages in substantially planar physical contact with the corresponding surface 218 of the power contact 206 to establish electrical communication (e.g., electrical current passes between the electrode body 202 and the power contact 206 at the interface of the contact surface 216 and the corresponding surface 218). When the contact surface 216 of the electrode body 202 abuts the corresponding surface 218 of the power contact 206, a current path is established such that a current passes directly between the power contact 206 and the electrode body 202. In some embodiments, the resilient conductive element 204 no longer carries a substantial amount of electrical current after the electrode body 202 is moved into contact with the power contact 206. In such embodiments, the resilient conductive element 204 carries electrical current during initiation of the pilot arc, but not the entire duration of pilot arc operation. In some embodiments, the resilient conductive element 204 continues to carry electrical current during the entire duration of pilot arc operation.

When the arc has been transferred to the workpiece, a cutting current is supplied to the torch 240 (e.g., during transferred arc mode). In some embodiments, the resilient conductive element 204 does not carry a substantial amount of electrical current during transferred arc mode. More particularly, the current path directly between the power contact 206 and the electrode body 202 has lower resistance and/or higher conductance than the current path from the power contact 206 through the resilient conductive element 204 to the electrode body 202. The design illustrated in FIGS. 2A, 2B, and 2C combines dual functions, namely biasing the electrode body 202 toward the nozzle 244 and providing an electrical current path between the power contact 206 and the electrode body 202, into a single component to reduce the number of consumable components and to simplify torch design.

Previous torch designs, for example as disclosed in U.S. Pat. No. 4,791,268, assigned to Hypertherm, Inc. of Hanover, N.H., employed a spring for providing a mechanical force to bias various torch components. These torch designs also employed an electrical component (e.g., a non-resilient wire) for supplying electrical current for both pilot arc operation and transferred arc operation. Such designs required the wire, as the primary current path, to have a relatively large diameter to facilitate passing electrical current (e.g., up to 200 amps) during transferred arc operation without melting the wire.

In some embodiments, the resilient conductive element 204 is a conductive wire or metal strip for passing an electrical current between the power contact 206 and the electrode body 202 during pilot arc operation. When the electrode body 202 is in the blown-back state (e.g., surface 216 of the electrode body 202 is in physical contact and electrical communication with surface 218 of the power contact 206), substantially all of the electrical current for sustaining a plasma arc in transferred arc mode is passed directly between the surface 216 and the surface 218. More specifically, the current path between the surface 216 and the surface 218 when the surfaces 216, 218 are in physical contact can have a lower resistance and/or a higher conductivity than the resilient conductive element 202. Such a design employing a wire instead of a spring as the resilient conductive element 204 permits a wire having a smaller diameter and increased flexibility compared to the plunger wire of U.S. Pat. No. 4,791,268. A smaller wire is possible because the resilient conductive element 204 of FIGS. 2A, 2B, and 2C does not carry the full electrical current associated with transferred arc operation.

In some embodiments, the resilient conductive element 204 is a conductive sleeve in electrical communication with the power contact 206 and the electrode body 202 for passing a pilot arc current therebetween. For example, such a sleeve can be designed to fit closely over the proximal end 210 of the electrode body 202 and over the portion 220 of the power contact 206. In some embodiments, a second resilient element (not shown), for example a spring, can be used in conjunction with a sleeve to provide the mechanical function of biasing the electrode body 202 toward the nozzle 244.

In some embodiments, both the power contact 206 and the resilient conductive element 204 are mounted to the torch body 242 and are relatively secured with respect to the moveable electrode body 202. For example, when the nozzle 244 is removed from the torch body 242, the resilient conductive element 204 urges the electrode body 202 out of the torch body 242 (e.g., the electrode body 202 is ejected), and the current path between the resilient conductive element 204 and the electrode body 202 is broken. In such an embodiment, the electrode body 202 is a consumable component of the torch 240. In other embodiments, the combination of the electrode body 202 and the resilient conductive element 204 is a consumable component of the torch 240, e.g., the pieces can be sold or purchased together as a package.

Figure 3A:
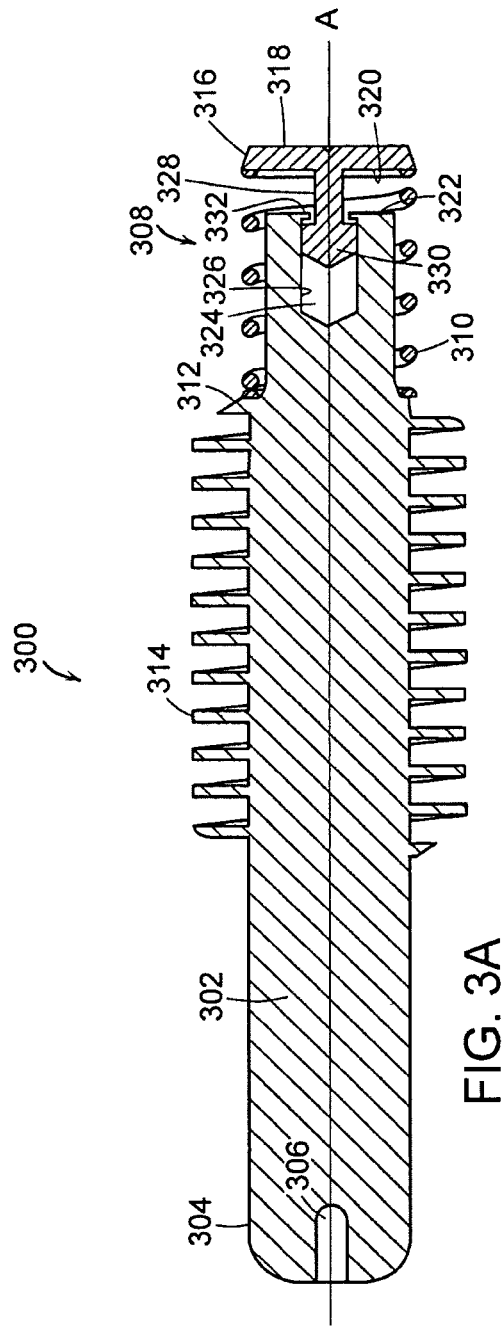
FIG. 3A is a cross section of an exemplary embodiment of an electrode for use in a contact start plasma arc torch.

FIG. 3A is a cross section of an exemplary embodiment of an electrode for use in a contact start plasma arc torch. The electrode 300 includes an elongated electrode body 302 oriented along a longitudinal axis A. The electrode body 302 can be formed of an electrically conductive material such as tellurium copper, silver, silver copper alloys, or other alloys. The electrode body 302 includes a distal end 304 that includes a bore 306 for housing an emissive element (not shown) and a proximal end 308. The emissive element can be made from, for example, hafnium and is used to increase the operational life of a plasma arc torch (not shown) and to reduce wear on the electrode body 302. During operation of the plasma arc torch and workpiece processing, the distal end 304 of the electrode body 302 is positioned near the workpiece (not shown), and the proximal end 308 is positioned remotely from the workpiece. The electrode body 302 is movable along the longitudinal axis A when the electrode 300 is mounted within the torch.

The electrode 300 includes an electrically conductive resilient element 310 (also referred to herein as the resilient conductive element 310). The resilient conductive element 310 is configured to pass substantially all of a pilot arc current between a power supply (not shown) and the electrode body 302 during pilot arc operation. The resilient conductive element 310 is depicted as a helical spring that engages a radially extending flange 312 (e.g., a shoulder) disposed on the proximal end 306 of the electrode body 302. The flange 312 can be a reaction surface for the resilient conductive element 310. The physical contact between the resilient conductive element 310 and the flange 312 of the electrode body 302 provides a current path.

In some embodiments, the resilient conductive element 310 is secured to the flange 312 (e.g., by soldering or welding) such that the resilient conductive element 310 is retained by the electrode body 302. The resilient conductive element 310 can be retained by a diametral interference fit or other type of friction fit. In some embodiments, the resilient conductive element 310 is formed integrally with the electrode body 302 (e.g., the electrode body 302 and the resilient conducting element 310 are fabricated from the same piece of material). The resilient conductive element 310 can be secured with respect to the electrode body 302 to hinder disengagement of the resilient conductive element 310 from the electrode body 302 during processing or maintenance operations.

As illustrated, the electrode body 302 includes a series of fins 314 that are formed integrally with the electrode body 302. The fins 314 increase the surface area of the electrode body 302 and function as heat transfer surfaces to cool the electrode body 302 during torch operation. The fins 314 also form a type of seal that allows a plasma gas introduced in the plasma chamber (e.g., the plasma chamber 254 of FIG. 2B) to build sufficient gas pressure to move the electrode body 302 longitudinally along axis A toward the proximal end 308. As discussed above, movement of the electrode body 302 toward the proximal end 308 initiates the pilot arc when a pilot arc current is passed between the resilient conductive element 310 and the electrode body 302.

The placement of the fins 314 provides a spiral groove axially along the electrode body 302. Exemplary fins 314 are illustrated in U.S. Pat. No. 4,902,871 assigned to Hypertherm, Inc. of Hanover, N.H., the contents of which are hereby incorporated herein by reference. The fins 314 are depicted as radially extending from the longitudinal axis A. Other configurations of fins 314 are possible, for example, extending longitudinally along the axis A, such as illustrated in U.S. Pat. No. 6,403,915 also assigned to Hypertherm, Inc. of Hanover N.H., the contents of which are hereby incorporated herein by reference. Some embodiments of the electrode 300 do not include the fins 314, and the gas pressure exerts a force against a different surface of the electrode body 302 to move the electrode body during initiation of a pilot arc.

The electrode 300 includes a contact element 316 that includes a first surface 318 and a second surface 320. The first surface 318 is configured for electrical communication with a power supply (not shown). For example, the first surface 318 can abut a corresponding surface of a power contact (e.g., the power contact 206 of FIG. 2A, not shown in FIG. 3A). The power supply can provide electrical current to the contact element 316 through the power contact. The second surface 320 is configured for electrical communication with a corresponding contact surface 322 of the electrode body 302 after initiation of the pilot arc and during transferred arc mode. In some embodiments, the first surface 318 of the contact element 316 is substantially stationary when the electrode 300 is mounted within the torch (e.g., the first surface 318 maintains physical engagement or contact with the power contact). The contact element 316 can be made from a relatively hard and electrically conductive material, for example, stainless steel, chromium copper, nickel, or beryllium copper. In some embodiments, the contact element 316 is made from a material harder than the material that forms the electrode body 302. In some embodiments, the contact element 316 is coated with a relatively hard and electrically conductive material.

As depicted, the resilient conductive element 310 circumscribes the proximal end 308 of the electrode body 302 and engages the second surface 320 of the contact element 316. Other configurations for providing a current path from the contact element 316 through the resilient conductive element 310 to the electrode body 302 are within the scope of the invention. In some embodiments, a second conductive element (not shown) provides a current path between the contact element 316 and the electrode body 302 having lower resistance and/or higher conductivity than the resilient conductive element 310. In such embodiments, the resilient conductive element 310 biases the electrode body away from the contact element 316 (e.g., performs a mechanical function) but does not carry a substantial amount of pilot current. In some embodiments, the resilient conductive element 310 is secured to the contact element 316 (e.g., by soldering or welding) or formed integrally with the contact element 316. In some embodiments, the resilient conductive element 310 can be disposed between the second surface 320 of the contact element 316 and the corresponding contact surface 322 of the electrode body. In some embodiments, the first surface 318 of the contact element 316 engages the resilient conductive element 310.

The illustrated electrode body 302 includes a receptacle 324 disposed at the proximal end 308 of the electrode body 302 and separated from the bore 306 at the distal end 304 by the electrode body 302 (e.g., neither the bore 306 nor the receptacle 324 is a through-hole). In some embodiments, the receptacle 324 is substantially aligned with the axis A and defines an inner surface 326. The contact element 316 includes a connective member 328 that extends from the second surface 320. In some embodiments, the connective member 328 slideably engages the electrode body 302. For example, the connective member 328 includes an aligning portion 330 that is substantially coaxial with the longitudinal axis A. The aligning portion 330 can slideably engage the inner surface 326 of the receptacle 324. In some embodiments, the engagement between the aligning portion 330 and the inner surface 326 restrains radial motion of the electrode body 302 or the contact element 316 within the torch.

The receptacle 324 can be configured to hinder disengagement of the contact element 316 from the electrode body 302. The electrode body 302 includes a restraint surface 332 disposed at the proximal end of the receptacle 324 for reacting against a portion of the contact element 316 to hinder disengagement. In some embodiments, the restraint surface 332 reacts against the connective member 328 or the aligning portion 330 of the contact element 316 (e.g., by a diametral interference fit). In some embodiments, the restraint surface 332 includes an annular or ring-like configuration. The restraint surface 332 can be disposed within the receptacle 324 such that the restraint surface does not interfere with or prevent the second surface 320 of the contact element 316 from physically contacting the contact surface 322 of the electrode body 302 in a substantially planar manner.

In some embodiments, the first surface 318, the second surface 320, or both can be coated with silver or a silver alloy to improve the electrical current flow between the power supply and the electrode body 302 (e.g., by reducing the electrical resistance at the surfaces 318 and 320 of the contact element 316. In some embodiments, the slideable engagement between the contact element 316 and the electrode body 302 provides a current path of lower resistance and/or higher conductivity than the resilient conductive element 310. In such embodiments, the resilient conductive element 310 biases the electrode body away from the contact element 316 (e.g., performs a mechanical function) but does not carry a substantial amount of pilot current. More specifically, the connective member 328 or the aligning portion 330 can be fabricated to relatively tight tolerances sufficient to form a low-resistance path for electrical current to pass to the electrode body 302, for example, via the receptacle 324. Relatively tight tolerances are required to prevent ionization or formation of an arc in the space between the connective member 328 or aligning portion 330 and the receptacle 324.

Figure 3B:
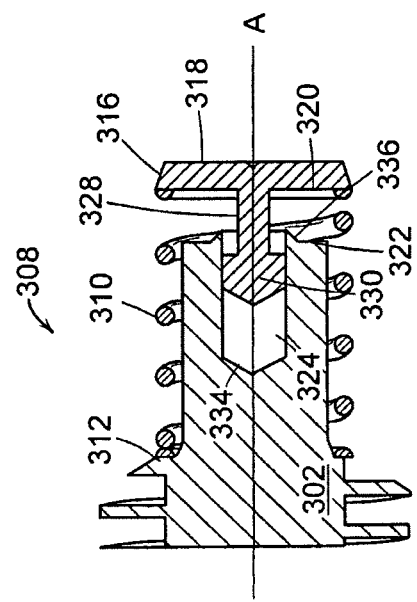
FIG. 3B is a more detailed illustration of the components of the electrode of FIG. 3A prior to assembly of an embodiment of the electrode.

FIG. 3B is a more detailed illustration of the components of the electrode of FIG. 3A prior to assembly. FIG. 3B illustrates a close-up view of the proximal end 308 of the electrode body 302. In the illustrated embodiment, the electrode body 302, resilient conductive element 310, and the contact element 316 do not form an integral assembly. More particularly, the contact element 316 (e.g., the connective member 128 and aligning portion 130) can be freely disengaged from the resilient conductive element 310 and the electrode body 302 (e.g., the receptacle 324). In some embodiments, the length of the connective member 328 and the aligning portion 330 does not exceed the depth of the receptacle 324 such that the contact element does not "bottom out" against the bottom surface 334 of the receptacle 324.

The proximal end 308 of the electrode body 302 can define a lip 336 adjacent the receptacle 324 that extends axially along the longitudinal axis A. The lip 336 can be formed from the same piece of material as the electrode body 302. In some embodiments, the contact element 316 may be retained with respect to the electrode body 302 (e.g., a portion of the electrode body 302 hinders disengagement of the contact element 316 from the electrode body 302). For example, the connective member 328 and the aligning portion 330 can be positioned within the receptacle 324. The contact element 316 is pressed against the electrode body 302 such that the second surface 320 of the contact element 316 engages the lip 336 as the second surface 320 advances into physical contact with the contact surface 322 of the electrode body 302.

The engagement between the second surface 320 and the lip 336 deforms the lip 336 into the adjacent receptacle 324 to enable facing physical contact between the second surface 320 of the contact element 318 and the contact surface 322 of the electrode body 302. The deformed lip 336 can form the restraint surface 332 of FIG. 3A. In some embodiments, the contact element 316 is pressed against the electrode body 302 at the same time the emissive element is disposed within the bore 306. For example, during a process known as swaging, a force along the longitudinal axis A (e.g., toward the proximal end 308 of the electrode body 302) is applied with respect to the emissive element to secure the emissive element within the bore 306. During swaging, an oppositely-oriented force (e.g., toward the distal end 304 of the electrode body 302) is applied to press the contact element 316 against the proximal end 308 of the electrode body 302 to deform the lip 336. In some embodiments, the applied force is about 4,450 N of force (e.g., approximately 1000 lbs. of force). In some embodiments, after swaging, the restraint surface 332 can withstand about 356 N of force (e.g., about 80 lbs. of force) before failing (e.g., permitting the contact element 316 to be disengaged from the electrode body 302).

In some embodiments, the resilient conductive element 310 is disposed between the electrode body 302 (e.g., in physical contact with the flange 312) and the contact element 316 (e.g., in physical contact with the second surface 320) prior to deforming the lip 336. The resilient conductive element 310 can be "captured" between the contact element 316 and the electrode body 302. The restraint surface 332 can hinder disengagement of the slideably mounted contact element 316 from the electrode body 302. In some embodiments, the electrode 300 is assembled prior to use within a plasma arc torch and can be packaged as an integral assembly.

In some embodiments, the restraint surface 332 has an annular configuration (e.g., when the lip 336 axially extends along the longitudinal axis A about the circumference of the receptacle 324). In other embodiments, the restraint surface 332 is formed along a portion of the circumference of the receptacle 324 less than the entire circumference. The connective member 328 or the aligning portion 330 can be freely inserted into the receptacle 324 without interference with the restraint surface 336, but, e.g., rotating the contact element 316 about the longitudinal axis A hinders disengagement of the contact element 316 by establishing interference between the restraint surface 332 and the connective member or the aligning portion 330.

Figure 4A:
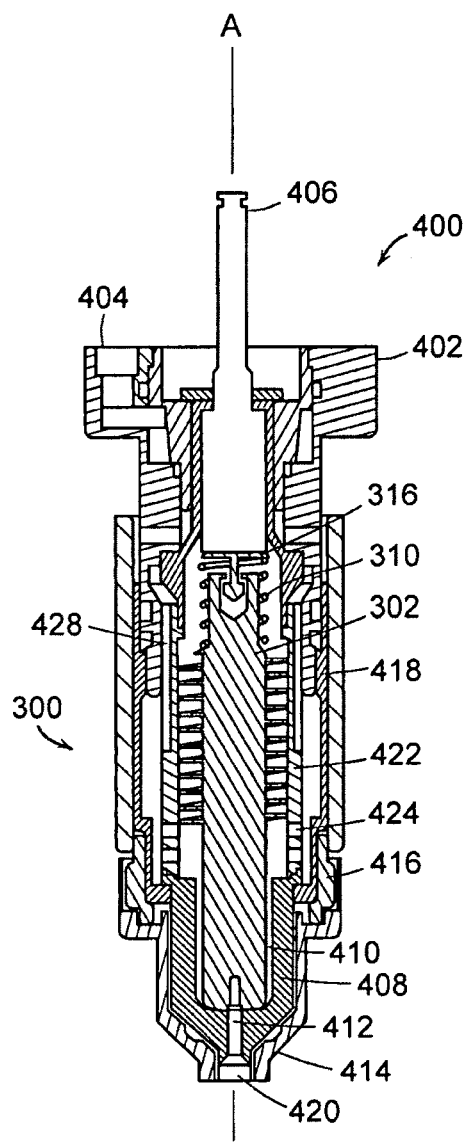
FIG. 4A depicts a cross section of an exemplary contact start plasma arc torch including illustrative components in a configuration prior to pilot arc operation.

FIG. 4A depicts a cross section of an exemplary contact start plasma arc torch. The configuration of FIG. 4A can be referred to as the "forward" configuration or the "start" configuration. The torch 400 includes a torch body 402 that defines a gas inlet 404. The torch 400 includes a power contact 406 in electrical communication with a power supply (not shown) that provides an electrical current to the power contact 406. The torch 400 includes the electrode 300 of FIG. 3A. The first surface 318 of the contact element 316 is configured for physical contact and electrical communication with the power contact 406. The resilient conductive element 310 urges the electrode body 302 away from the power contact 406 and into physical contact and electrical communication with a nozzle 408. The electrode body 302 (e.g., the distal end 304 of the electrode body 302) cooperates with the nozzle 408 to form a portion of a plasma chamber 410. The nozzle 408 includes an exit orifice 412 that permits the plasma arc or jet (not shown) to exit the plasma chamber 410 for transferring to a workpiece (not shown). A shield 414 is mounted to a retaining cap 416 that is mounted on a portion 418 of the torch body 402. The shield 414 includes an exit port 420 that is adjacent the exit orifice 412 of the nozzle 408. The exit port 420 permits the plasma jet to be transferred from the torch 400 to the workpiece. The shield 414 prevents material that is spattered during workpiece processing from accumulating on the nozzle 408 and reducing the useful life of the nozzle 408 or the electrode 300. The torch 400 also includes a swirl ring 422 that defines one or more ports 424 that permit a gas (not shown) to flow into and out of the plasma chamber 410.

Pilot arc operation begins with initiation of a pilot arc. A pilot current is passed between the power supply and the power contact 406. The power contact 406 passes the pilot current to the contact element 316 across the interface between the power contact 406 and the first surface 318 of the contact element 316. The pilot current passes between the contact element 316 (e.g., the second surface 320) and the resilient conductive element 310. The current then passes between the resilient conductive element 310 and the electrode body 302 and the nozzle 408. An exemplary current suitable for use as a pilot arc current is between about 22 and 31 amps. In some embodiments, the power contact 406 is fabricated from tellurium copper, brass, copper, or other materials suitable for passing current both during pilot arc operation and transferred arc operation.

During pilot arc operation, gas enters the torch 400 through the inlet 404 defined by the torch body 402. The gas is directed along a passageway 426 defined by the torch body 402. The swirl ring 422 defines one or more channels 428 that allow the gas to pass from the passageway 426 to a space 430 defined by the exterior of the swirl ring 422 and the portion 418. The gas flows through the ports 424 into the plasma chamber 410. Gas pressure in the plasma chamber 410 builds until the pressure is sufficient to overcome the force provided by the resilient conductive element 310 and move the electrode body 302 away from the nozzle 408 thereby creating a space or gap between the electrode body 302 and the nozzle 408. In some embodiments, gas in the plasma chamber 410 acts on the fins 314 of the electrode body 302, exerting a pressure along the longitudinal axis A toward the proximal end 310 of the electrode body 302. The electrode body 302 moves with respect to the torch 400 substantially along the longitudinal axis A. In some embodiments, the contact element 316 aligns the electrode body 302 by restraining radial motion of the electrode body 302 both during pilot arc operation and during transferred arc mode. As the electrode body 302 is moved away from the nozzle 408, a relative electric potential develops between the electrode body 302 and the nozzle 408. The potential difference causes an arc (not shown) to be generated in the now present gap between the electrode body 302 and the nozzle 408 (e.g., by ionizing a path of least resistance between the electrode body 302 and the nozzle 408). The arc ionizes the gas in the plasma chamber 310 to form the plasma jet used in workpiece processing.

Figure 4B:
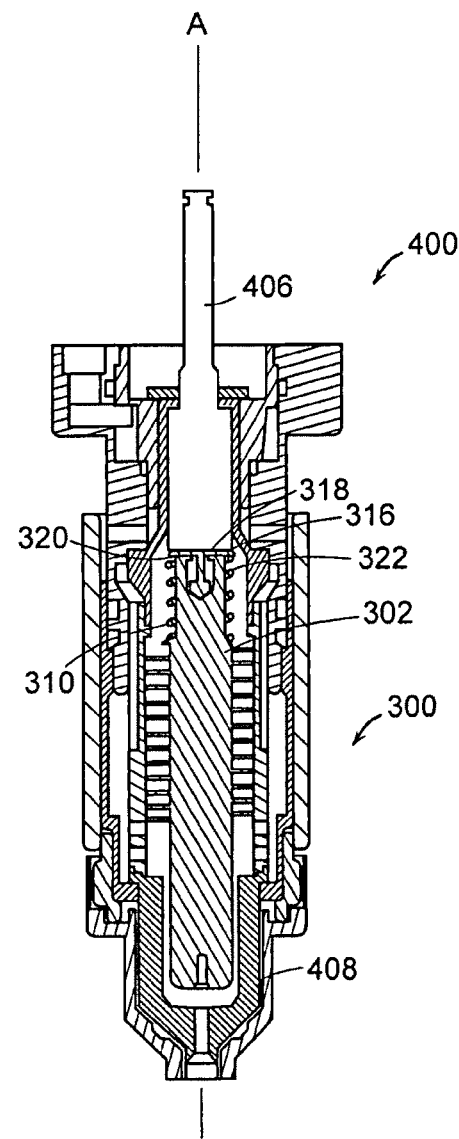
FIG. 4B illustrates a cross section the plasma arc torch of FIG. 4A including illustrative components in a configuration during transferred arc mode.

FIG. 4B illustrates a cross section the plasma arc torch of FIG. 4A including illustrative components after pilot arc initiation. The configuration of FIG. 4B can be referred to as the "blown-back" configuration because the electrode body 302 has been separated from the nozzle 408. The electrode body 302 is moved along the axis A until the contact surface 322 of the electrode body 302 contacts the second surface 320 of the contact element 316. The first surface 318 of the contact element 316 maintains physical contact and electrical communication with the power contact 406 that is relatively stationary with respect to the electrode body 302. In some embodiments, the duration of time during which the electrode body 302 moves along the axis A is less than or equal to about 0.3 seconds. In some embodiments, the resilient conductive element 310 carries electrical current in the blown-back configuration (e.g., during pilot arc operation after pilot arc initiation). In some embodiments, the resilient conductive element 310 carries electrical current only during pilot arc initiation.

In general, the arc is transferred from the nozzle 408 to the workpiece (not shown) for workpiece processing by positioning the torch 400 near the workpiece. The workpiece is maintained at a relatively lower electric potential than the nozzle 408. In some embodiments, the arc is transferred during pilot arc initiation (e.g., before the blown-back configuration of FIG. 4B). An electrical lead (not shown) in communication with the workpiece can provide a signal to the power supply (not shown) based on the transfer of the arc to the workpiece. When the electrode body 302 is in the blown-back configuration, the power supply provides an increased electrical current (e.g., a cutting current) to the torch 400. One example of a method for increasing the electrical current to the torch is known as "dual-threshold" and is described in U.S. Pat. No. 6,133,543 and assigned to Hypertherm, Inc. of Hanover, N.H., the disclosure of which is hereby incorporated herein by reference.

The cutting current can be, for example, approximately 100 to approximately 150 amps. The cutting current is associated with operation of the torch 400 in transferred arc mode. In some embodiments, the amount of cutting current that is provided is dependent on the composition of the workpiece or on physical properties of the workpiece (e.g., thickness of the workpiece or the depth of a cut). In some embodiments, transferred arc mode refers to both the arc being transferred to the workpiece and the power supply providing the cutting current. In other embodiments, transferred arc mode refers to the arc being transferred to the workpiece.

When the electrode body 302 is in the blown-back configuration, the power supply provides electrical current to the power contact 406, to the contact element 316, and to the electrode body 302. The contact element 316 remains relatively stationary with respect to the electrode body 302 and power contact 406. More particularly, the first surface 318 of the contact element 316 can be designed to remain in physical contact and electrical communication with the power contact 406 after the electrode 300 is installed in the torch 400. In some embodiments, the contact element 316 is secured relative to the power contact 406, for example by a friction fit, e.g., such that the earth's gravitational force acting on the electrode body 302 is insufficient to remove the electrode 300 from the torch 400. Most of the wear on the electrode 300 occurs at the interface between the second surface 320 of the contact element 316 and the contact surface 322 of the electrode body 302 due to the repeated contact and separation of the electrode body 302 and the contact element 316 during operation (e.g., starting and stopping) of the torch 400. The design of the electrode 300 reduces the amount of wear on the power contact 406 because the first surface 318 of the contact element 316 remains in contact with the power contact 406 to reduce the formation of an arc between the power contact 406 and the first surface 318. Formation of an arc between the power contact 406 and the first surface 318 can create surface imperfections that reduce the operational life of the power contact 406 and the electrode 300.

Figure 5A:
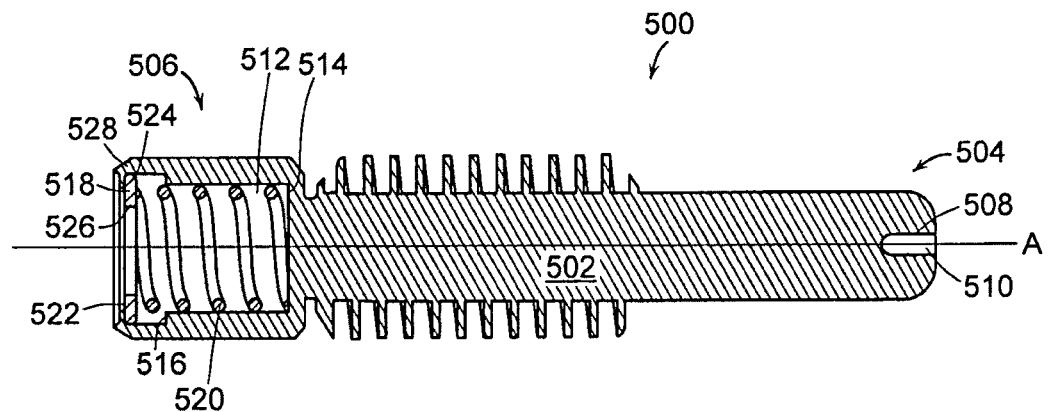
FIG. 5A depicts a cross section of an exemplary electrode including a contact element and a resilient conducting element disposed within a receptacle of the electrode body.

FIG. 5A depicts a cross section of an exemplary electrode including a contact element and a resilient conducting element disposed within a receptacle of the electrode body. The electrode 500 includes an electrode body 502 defining a distal end 504 and a proximal end 506 oppositely disposed along the longitudinal axis A. The distal end 504 defines a bore 508 for receiving an emissive element 510. The proximal end 506 of the electrode body 502 defines a receptacle 512 in a cylindrical configuration centered about the longitudinal axis A. In some embodiments, a non-cylindrical configuration for the receptacle 512 can be used. The receptacle 512 is separated from the bore 508 by the electrode body 502 (e.g., the electrode body 502 does not have a through-hole). The receptacle 512 defines a first contact surface 514 disposed at the bottom of the receptacle 512. The contact surface 514 is configured for electrical communication and/or physical contact with a power contact (depicted in FIG. 5B). The receptacle 512 also defines a second contact surface 516.

The electrode 500 includes a contact element 518 and a resilient conductive element 520 that are disposed within the receptacle 512. The contact element 518 defines a first surface 522 and a second surface 524. The second surface 524 is configured to react against the resilient conductive element 520 and against the second contact surface 516 of the receptacle 512. The resilient conductive element 520 reacts against the first contact surface 514 to urge the electrode body 502 into abutting relation with a nozzle (not shown) when installed within a plasma torch. In some embodiments, the resilient conductive element 520 can react against a third surface (not shown) within the receptacle 512.

The contact element 518 defines an annular configuration designed to surround a power contact. The annular configuration provides an aligning portion 526 to restrain radial motion of the electrode body 502 by reacting against the power contact. The contact element 518 and resilient conductive element 520 are retained with respect to the receptacle 512 by a tapered portion 528 of smaller diameter than the diameter of the contact element 518. In some embodiments, the tapered portion 528 is a restraint surface that hinders disengagement of the contact element 518 and the resilient conductive element 520 from disengaging the electrode body 502 (e.g., the receptacle 512). For example, the combination of the tapered portion 528 and the contact element 518 hinder the resilient conductive element 520 from disengaging the electrode body 502 by a diametral interference fit. In some embodiments, the tapered portion 528 defines an annular configuration. In some embodiments, the receptacle 512 does not include a tapered portion 528, and the contact element 518 and the resilient conductive element 520 are not retained with respect to the receptacle 512.

Figure 5B:
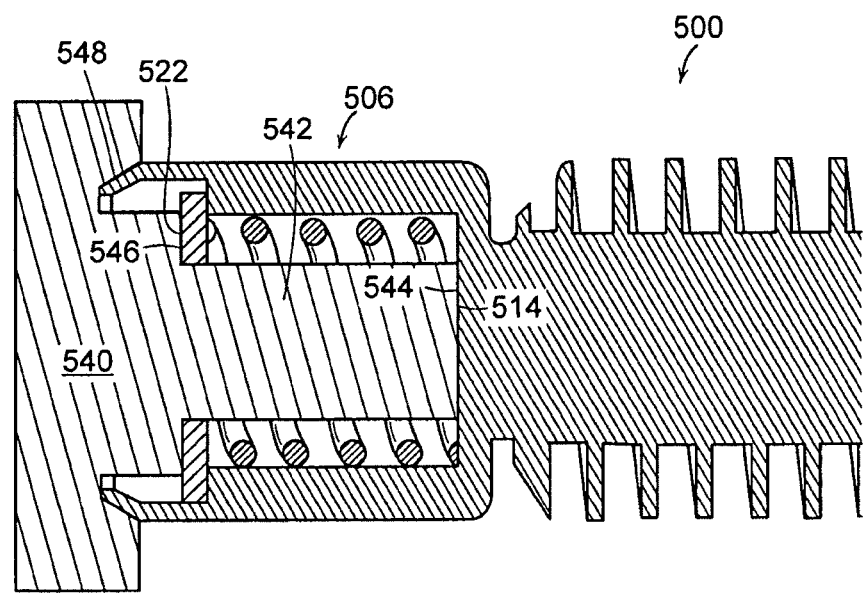
FIG. 5B depicts the electrode of FIG. 5A disposed in a transferred arc mode.

FIG. 5B depicts the electrode of FIG. 5A disposed in a transferred arc mode. FIG. 5B illustrates a close-up of a cross-section of the proximal end 506 of the electrode body 502 and a power contact 540. The power contact 540 defines an axially extending portion 542 configured to interact with the receptacle 512 and the contact element of the electrode 500. The axially extending portion 542 defines a first corresponding surface 544 and a second corresponding surface 546 for electrical communication and/or physical contact with the first contact surface 514 of the electrode body 502 (e.g., as defined by the receptacle 512) and the first surface 522 of the contact element 518, respectively. The power contact 540 also defines a seat portion 548 configured to correspond to the tapered portion 528 of the electrode body 502 to restrain radial motion of the electrode body 502.

In some embodiments, the electrode 500 is positioned within a torch such that the first surface 522 of the contact element 518 is in electrical communication and/or physical contact with the second corresponding surface 546 of the power contact 540 to form an interface that remains relatively stationary with respect to the electrode body 502 during torch operation. The second surface 524 of the contact element 518 is initially remote from the second contact surface 516 of the receptacle 512, and the first corresponding surface 544 of the power contact is remote from the contact surface 514 of the electrode body 502.

During pilot arc operation, a pilot current passes between the power supply (not shown) and the power contact 540. The pilot current passes from the power contact 540 to the contact element 518 and from the contact element 518 through the resilient conductive element 520 to the electrode body 502, such that the resilient conductive element 518 carries substantially the entire pilot arc current. As the electrode body 502 is moved away from the nozzle (not shown) to generate an arc, the second contact surface 516 moves into contact with the second surface 524 of the contact element 516, and the first contact surface 514 moves into contact with the first corresponding surface 544 of the power contact 540. Substantially all of the cutting current is passed from the power contact 540 through the contact element 516 to the electrode body 502 and directly to the electrode body. During transferred arc operation, the resilient conductive element 520 does not carry a substantial amount of current.

In some embodiments, the first corresponding surface 544 or the second corresponding surface 546 pass substantially all of the electrical current during transferred arc operation to the electrode body 502. Multiple corresponding surfaces 544, 546 can reduce physical wear on the first contact surface 514 of the electrode body 502 or the first surface 522 of the contact element 518. Such a configuration results in reduced wear by reducing the mechanical load associated with physical contact between the power contact 540 and each of the contact element 518 and the electrode body 502. Reduced wear can prolong the life of the electrode 500.

Figure 6A:
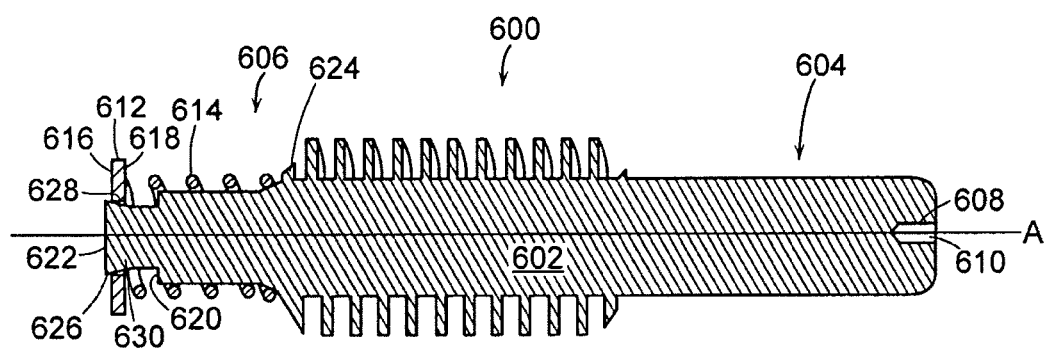
FIG. 6A depicts a cross section of an exemplary electrode including a contact element and resilient conducting element disposed at a proximal end of the electrode body.

FIG. 6A depicts a cross section of an exemplary electrode including a contact element and resilient conducting element disposed at a proximal end of the electrode body. The electrode 600 includes an electrode body 602 defining a distal end 604 and a proximal end 606 oppositely disposed along the longitudinal axis A. The distal end 604 defines a bore 608 for receiving an emissive element 610. The electrode 600 includes a contact element 612 and a resilient conductive element 614. The contact element 612 defines a first contact surface 616 configured for electrical communication and/or physical contact with a power contact (see FIG. 6B) and a second contact surface 618 for electrical communication and/or physical contact with a corresponding surface 620 of the electrode body 602. The proximal end 606 of the electrode body 602 defines a contact surface 622 for electrical communication and/or physical contact with the power contact. The electrode body 602 defines a reaction surface 624 for reacting against the resilient conductive element 614 to provide a biasing force against the reaction surface 624 and the electrode body 602. The proximal end 606 of the electrode body 602 defines a first restraint surface 626 for hindering disengagement of the contact element 612 and the resilient conductive element 614 (e.g., by a diametral interference fit). In some embodiments, the electrode body 602 does not include the restraint surface 624, and the contact element 612 and/or the resilient conductive element 614 are disengageable with respect to the electrode body 602. In some embodiments, the resilient conductive element 614 is secured to one of the electrode body 602 or the contact element 612 or both.

The contact element 614 defines an annular configuration and includes an aligning portion 628 that restrains radial motion of the electrode body 602. For example, the aligning portion 628 can interact with an axially extensible portion 630 of the proximal end 606 of the electrode body 602. The portion 630 defines a diameter slightly less than the diameter of the aligning portion 628 such that the portion 630 can slidingly engage the aligning portion 628 along the longitudinal axis A without a significant radial perturbation.

Figure 6B:
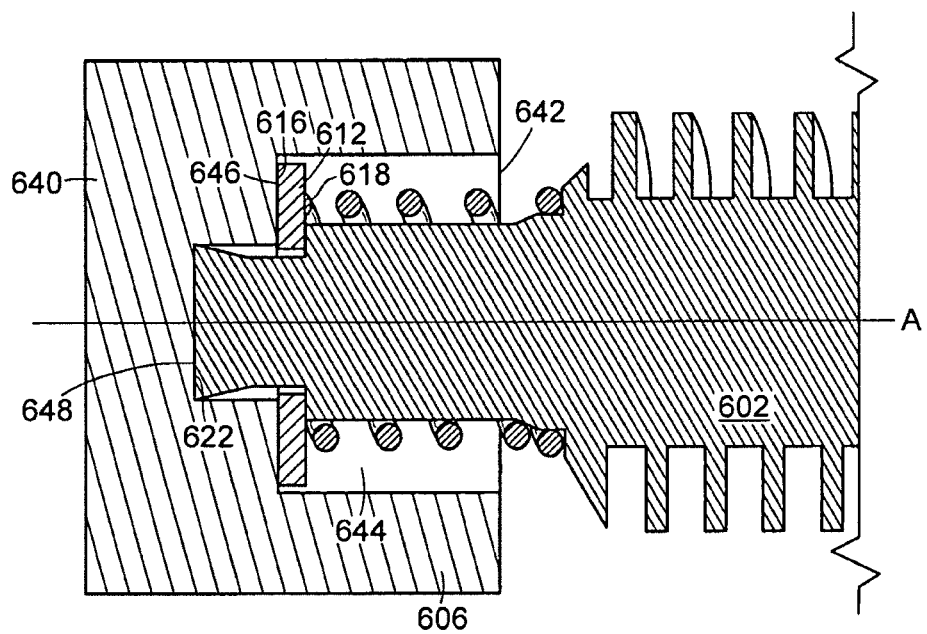
FIG. 6B depicts the electrode of FIG. 6A disposed in a transferred arc mode.

FIG. 6B depicts the electrode of FIG. 6A disposed in a transferred arc mode. The configuration of FIG. 6B includes a power contact 640 positioned relative to the proximal end 606 of the electrode body 602. The power contact 640 defines an opening 642 into which the proximal end 606 of the electrode body 602 advances as the electrode body 602 moves away from the nozzle (not shown) under gas pressure. The opening 642 is adjacent a receptacle portion 644 that is substantially centered about the longitudinal axis A. The receptacle portion 644 defines a first contact surface 646 for electrical communication and/or physical contact with the contact element 612 and a second contact surface 648 for electrical communication and/or physical contact with the contact surface 622 of the electrode body 602. The receptacle portion 644 is dimensioned to receive the contact element 612 and the resilient conductive element 614 in addition to a portion of the proximal end 606 of the electrode body 602. In some embodiments, the receptacle portion 644 is dimensioned to only receive the proximal end 606 of the electrode body 602.

During installation, the electrode 600 is positioned such that the first surface 616 is in electrical communication and/or physical contact with the first contact surface 646 of the power contact 640 to form an interface that is relatively stationary with respect to the electrode body 602 during torch operation. The second surface 618 of the contact element 612 is initially physically remote from the corresponding surface 620 of the electrode body, and the contact surface 622 of the electrode body 602 is initially physically remote from the second contact surface 648 of the power contact 640.

During pilot arc operation, a pilot current passes between the power supply (not shown) and the power contact 640. The pilot current passes from the power contact 640 to the contact element 612 and from the contact element 612 through the resilient conductive element 614 to the electrode body 602, such that the resilient conductive element 614 carries substantially the entire pilot arc current. As the electrode body 602 is moved away from the nozzle (not shown) to generate an arc, the corresponding surface 620 moves into electrical communication and/or physical contact with the second surface 618 of the contact element 612, and the contact surface 622 moves into electrical communication and/or physical contact with the second contact surface 648 of the power contact. Substantially all of the cutting current is passed from the power contact 640 through the contact element 612 to the electrode body 602 and directly to the electrode body 602. During transferred arc operation, the resilient conductive element 614 does not carry a substantial amount of the current.

In some embodiments, the first corresponding surface 646 or the second corresponding surface 648 pass substantially all of the electrical current during transferred arc operation to the electrode body 602. Multiple corresponding surfaces 646, 648 can reduce physical wear on the first contact surface 622 of the electrode body 602 or the first contact surface 616 of the contact element 612. Such a configuration results in reduced wear by reducing the mechanical load associated with physical contact between the power contact 640 and each of the contact element 612 and the electrode body 602. Reduced wear can prolong the life of the electrode 600.

FIG. 7A depicts a partially exploded view of an exemplary contact element, resilient element, and power contact that embody principles of the invention. The two-piece power connection 700 includes a power contact 702, a contact element 704, and a resilient element 706, substantially aligned along the longitudinal axis A. The power contact 702 defines an aperture 708 adjacent a cavity 710 for receiving an axially extensive portion 712 of the contact element 704. The diameter of the portion 712 is slightly smaller than the diameter of the cavity 710. A second resilient element 714 is radially dimensioned along an axial extent of the portion 712 to provide sufficient friction with respect to the cavity 710 to hinder the portion 712 and the contact element 704 from disengaging the power contact 702 (e.g., a friction fit) and to restrain radial motion of the contact element 704. In some embodiments, the second resilient element 714 is a Louvertac™ spring, for example, fabricated with beryllium copper and sold by Tyco Electronics Corp., of Harrisburg, Pa. Other copper alloys are also within the scope of the invention. In some embodiments, the second resilient element 714 is plated with a conductive metal, for example, gold, silver, nickel or tin. In some embodiments, the second resilient element 714 is electrically conductive and passes a portion of the electrical current supplied by a power supply (not shown) between the power contact 702 and the contact element 704. The resilient element 706 can pass a pilot arc current between the power supply and the electrode body during initiation of a pilot arc.

The power contact 702 defines a surface 716 adjacent the aperture 708 for passing electrical current to a first corresponding surface 718 of the contact element 704 where the first surface 718 is adjacent the extensive portion 712. The contact element 704 also includes a second surface 720 opposite the first surface 718 for reacting against the first resilient element 706. The contact element 704 includes a portion 722 axially protruding from the second surface 720 and defines a smaller diameter than an inside diameter of the resilient element 706 such that the resilient element 706 surrounds the portion 722. The portion 722 is configured for electrical communication with a proximal end of a torch electrode body (not shown). The portion 722 defines a perimeter surface 724 and an end surface 726. In some embodiments, the perimeter surface 724, the end surface 726, or both engage corresponding surfaces of the electrode body. The resilient element 706 is coupled to a component 728. The component 728 is designed for reacting against a corresponding surface (not shown) of the electrode body to provide an axial force directed toward the distal end (not shown) of the electrode body (e.g., away from the power contact 700). Gas pressure reacts against a gas reaction surface of the electrode body and overcomes the axial force to move the electrode body axially toward the proximal end until the perimeter surface 724, the end surface 726 or both react against corresponding portions of the electrode body during transferred arc operation.

In some embodiments, the component 728 is formed integrally and of the same material as the resilient element 706. In some embodiments, the component 728 is a separate component and/or formed from a different material that is secured to the resilient element 706. The component 728 is depicted as an annular washer coupled to the resilient element 706. Other configurations of the component 728 can be used, for example, a circular plate or a thimble design that circumscribes an adjacent axial outer portion of the resilient element 706 (e.g., a design similar to the contact element 904 discussed below with respect to FIG. 9). Such configurations permit the resilient element 706 to be hidden from the perspective of the electrode body, such that the electrode body and the component 728 move substantially together relative to the power contact 702. More specifically, the component 728 is stationary relative to the electrode body and movable relative to the contact element 704 and the power contact 702.

In some embodiments, a first surface (not shown) of the component 728 faces a corresponding surface of the electrode body and a second surface (not shown) of the component 728 faces the end surface 726 of the contact element 704. During transferred arc operation, the second surface of the component 728 is in physical contact with the end surface 726 of the contact element 704, and the first surface of the component 728 is in physical contact with the electrode body to provide an electrical current path from the power supply to the electrode body through the power contact 702 and the contact element 704.

In some embodiments, the resilient element 706 is not electrically conductive, and a conductive element (not shown) provides an electrical current path to the component

728 during pilot arc operation. The conductive element can be a wire or a conductive strip positioned to electrically connect the component to the contact element 704 or the power contact 702, for example, by soldering, welding or otherwise establishing electrical contact between the contact element 704 or the power contact 702 and the conductive element.

During transferred arc operation, a transferred arc current can be passed via physical contact between the contact element 704 (e.g., via the perimeter surface 724, the end surface 726, or both) and the electrode body. Such a configuration allows a conductive element with a relatively low current rating to be used to pass the pilot current to the electrode body, which allows a relatively small conductive element to be used. A small conductive element is beneficial to reduce physical interference between the conductive element and the moving parts of the torch system (e.g., the resilient element 706 and the electrode body). Substantially all of the operating current (e.g., pilot current and transferred arc current) is passed to the electrode body via the component 728.

FIG. 7B depicts the components of FIG. 7A disposed in a plasma arc torch operation. The portion 712 of the contact element 704 is advanced into the cavity 710, and the second resilient element 714 reacts against an inside surface (not shown) of the cavity 710 to hinder disengagement of the contact element 704 using friction. The first corresponding surface 718 of the contact element 704 seats against or is in physical contact with the surface 716 adjacent the cavity 710 to provide a current path from the power contact 702 to the contact element 704. In some embodiments, the contact element 704 or the resilient element 706 can be replaced without replacing the power contact 702. Because the interface between the power contact 702 and the contact element 704 (e.g., the interface between the surface 716 and the corresponding surface 718) is stationary relative to the power contact 702, the power contact 702 does not wear as quickly as in configurations in which the current path and the physical interface coincide. In some embodiments, the contact element 704, and the power contact 702 can form a unitary body (e.g., fabricated from the same piece of material) rather than as two separate pieces. The configuration of FIGS. 7A and 7B can be employed in existing contact start plasma arc torches, for example, as shown in FIG. 1, by replacing the unitary power contact 108 with the two-piece power connection 700 and by replacing the cathode block 116 to facilitate the power connection 700. The power connection 700 can be fastened relatively stationary with respect to the electrode body, for example, by a clip or a pin as discussed above.

FIG. 8A depicts a cross section of another embodiment of an electrode body, resilient conductive element, and contact element prior to installation within a plasma arc torch. The electrode 800 includes an electrode body 802, a contact element 804 and a resilient conductive element 806 substantially aligned with respect to the longitudinal axis A. FIG. 8A illustrates a proximal end 808 of the electrode 800 that can be disposed within a plasma arc torch body (not shown). The electrode body 802 features a shoulder 810 that extends radially from the electrode body 802. The shoulder 810 defines a first surface 812 and a second surface 814. In some embodiments, the first surface 812 acts as a restraint surface configured to contact a corresponding surface 816 of the contact element 804 and prevent disengagement of the contact element 804 from the electrode body 802 in the presence of an axially directed force (e.g., provided by the resilient conductive element 806, gas pressure, or in some cases gravity). The second surface 814 of the shoulder 810 is configured to engage a surface 818 of the resilient conductive element 806 to form a reaction interface.

The contact element 804 defines a first surface 820 and a second surface 822. The first surface 820 is designed or configured to seat against or mate with a corresponding surface (not shown) of a power contact (not shown) to establish physical contact and electrical communication. The second surface 822 of the contact element 804 is designed or configured to correspond a surface 826 defined by the electrode body 802. In some embodiments, the resilient conductive element 806 engages the second surface 822 of the contact element 804 to provide axially directed forces. The contact element 804 defines a receptacle 828. The receptacle 828 is sized to allow the resilient conductive element 806 to be disposed about a portion 830 of the electrode body 802 and disposed within the receptacle 828 of the contact element.

In some embodiments, during pilot arc operation, the first surface 820 of the contact element 804 is in electrical communication (and/or physical contact) with the power contact. The power contact provides an electrical current to the first surface 820 that is transferred across the contact element 804 to the second surface 822. Current can pass between the contact element 804 and the resilient conductive element 806 via the interface between the resilient conductive element 806 and the second surface 822. The resilient conductive element 806 provides a current path for passing current between the power contact and the electrode body 802. For example, current passes between the electrode body 802 and the resilient conductive element 806 at the interface between the surface 818 and the corresponding second surface 814 of the shoulder 810. In general, the receptacle 828, the resilient conductive element 806 and/or the surface 812 cooperate to restrain radial motion of the electrode body 802 when the electrode 800 is mounted with the plasma arc torch.

FIG. 8B illustrates the configuration of the components of FIG. 8A during transferred arc mode. During pilot arc mode, gas pressure reacts against the electrode body 802 to overcome the urging of the resilient conductive element 806 in a direction axially away from the proximal end 808 to move the electrode body 802, specifically the surface 826 into contact with the corresponding second surface 822 of the contact element 804. In this configuration, electrical communication can be established directly between the contact element 804 and the electrode body 802, and the electrical current can be increased for transferred arc operation. In some embodiments, the contact element 804 defines an end surface 840 that is remote from a surface 842 of the electrode body 802. In some embodiments, the end surface 840 contacts or "bottoms out" by reacting against the surface 842 to provide a second current path between the contact element 804 and the electrode body 802.

FIG. 9 depicts a cross section of another embodiment of an electrode that embodies the invention. The electrode 900 includes an electrode body 902, a contact element 904 and a resilient conductive element 906 substantially aligned along the longitudinal axis A. The electrode body 902 defines a radially extending surface 908 that can react against a surface 910 of the resilient conductive element 906 to hinder disengagement (e.g., capture) of the resilient conductive element 906 from the electrode body 902. The resilient conductive element 906 or the surface 910 can be advanced axially along the longitudinal axis A and forced or pressed over the surface 908 to form a diametral interference fit. Other types of fits may be used to hinder disengagement of the resilient conductive element 906 from the electrode body 902.

The contact element 904 defines a receptacle 912, a first surface 914 for electrical communication and/or physical contact with a corresponding surface of a power contact of a plasma arc torch (not shown), and a second surface 916 for electrical communication and/or physical contact with a corresponding surface 918 of the electrode body 902. The receptacle 912 can be dimensioned such that an inside diameter of the receptacle is slightly less than an outside diameter of the resilient conductive element 906. The contact element 904 and the receptacle 912 can be pressed or forced over the resilient conductive element 906 to establish a friction or other type of fit between a portion of the resilient conductive element 906 and the receptacle 912. In some embodiments, alternative or additional joints or fits can be used to secure the contact element 904 to the resilient conductive element 906 and the electrode 900. In general, the receptacle 912 cooperates with the resilient conductive element 906 to radially restrain the electrode body 902 when the electrode 900 is mounted within the plasma arc torch.

Figure 10B:
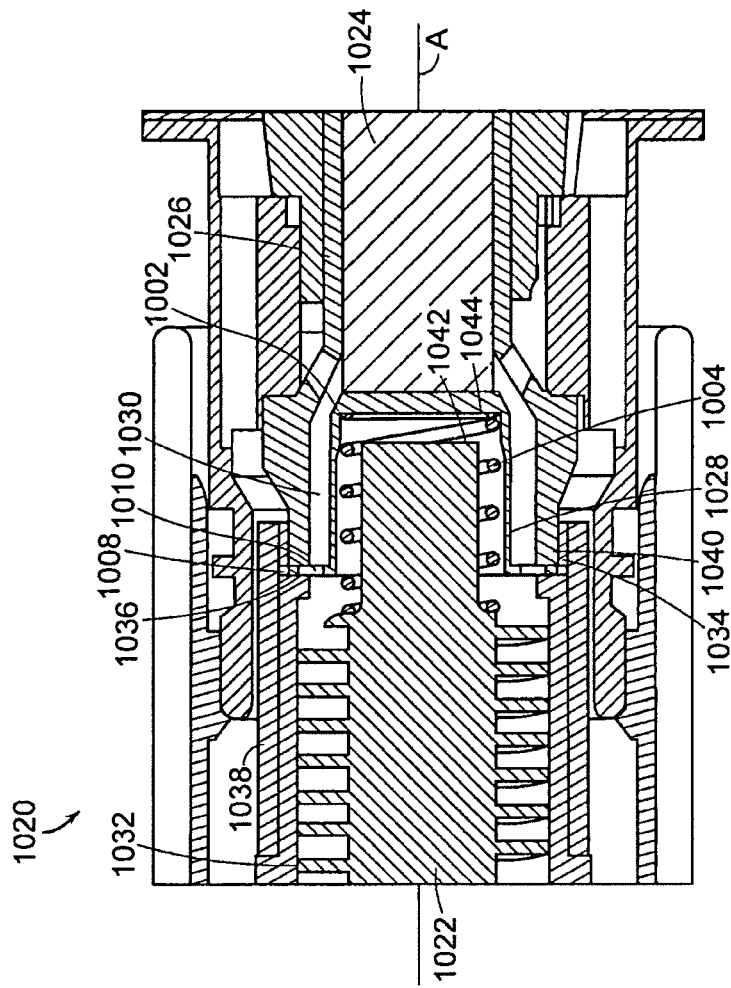
FIG. 10B is a cross-sectional view of a portion of a plasma arc torch employing the components of FIG. 10A during pilot arc operation.
Figure 10A:
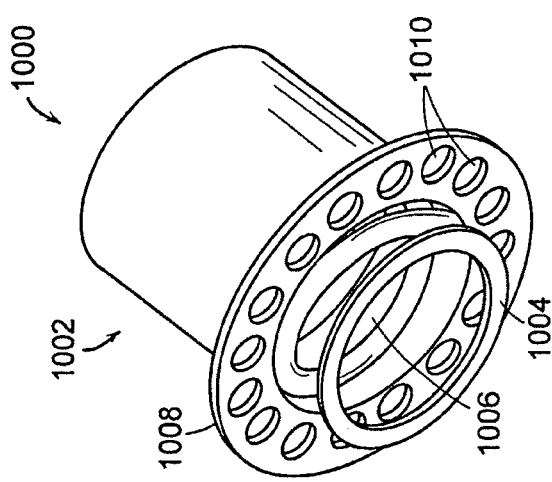
FIG. 10A is a perspective view of an exemplary contact element and resilient conductive element.

FIG. 10A is a perspective view of an exemplary contact element and resilient conductive element that embody principles of the invention. The system 1000 includes a contact element 1002 and a resilient conductive element 1004 disposed within a receptacle 1006 of the contact element 1002. The contact element 1002 includes a flange 1008 that defines one or more through-holes 1010 to facilitate gas passage about the system 1000. In some embodiments, the through-holes 1010 impart a swirling motion to gas as the gas moves about an electrode body, for example, to cool the electrode body or a plasma arc torch. In some embodiments, the resilient conductive element 1004 is secured or fastened (e.g., by bonding) to the contact element 1002. In some embodiments, the resilient conductive element 1004 is formed integrally with the contact element 1002.

FIG. 10B is a cross-sectional view of a portion of a plasma arc torch employing the components of FIG. 10A during pilot arc operation. The torch 1020 includes the contact element 1002, the resilient conductive element 1004, an electrode body 1022, and a power contact 1024 substantially aligned along the longitudinal axis A. In some embodiments, the power contact 1024 is in electrical communication with a power supply (not shown). The power contact 1024 is surrounded by a torch component 1026 that cooperates with an exterior surface 1028 of the contact element 1004 to define a gas passageway 1030. Gas can be supplied for generating the plasma arc and for workpiece processing as discussed above with respect to FIG. 2A. Gas pressure within the torch 1020 is relieved by flowing around the electrode body 1022 (e.g., by swirling around the electrode body 1022 guided by the fins 1032) towards the power contact 1024. Gas can flow through the holes 1010 in the contact element 1004 and along the gas passageway 1030 away from the electrode body 1022.

In the illustrated embodiment, the flange 1008 is disposed between a surface 1034 of the torch component 1026 and a surface 1036 of the swirl ring 1038. In some embodiments, the system 1000 of FIG. 10A is a consumable component and is installed within the torch 1020, and the electrode body 1022 is replaced more frequently than the system 1000. This allows, for example, the electrode body 1022 to be consumed and changed easily and without disassembling the torch 1020. In some embodiments, the system 1000 is secured with respect to the power contact 1024 by an interference fit. For example, the system 1000 is located within the torch 1020, and the swirl ring 1038 is secured (e.g., by threading) relative to an outside surface 1040 of the torch component 1026 to axially and/or radially secure the flange 1008 with respect to the torch component 1026, power contact 1024 and/or the torch 1020. In some embodiments, the flange reacts with or seats against other components of the torch 1020.

One or more components of the system 1000 can be integrated with the swirl ring 1038. For example, the flange 1008 can be bonded or otherwise secured to the swirl ring 1038 to form a unitary component. In some embodiments, the contact element 1002 is formed of the same material as the swirl ring 1038 during the machining or manufacturing process. The resilient element 1004 can be secured to the contact element 1002-swirl ring 1038 combination, for example by a diametral interference fit or other securing methods. In some embodiments, the resilient element 1004 is not secured to either the contact element 1002 or the swirl ring 1038.

The electrode body 1022 can be moved (e.g., by gas pressure) towards the power contact 1024 such that a surface 1042 of the electrode body 1022 engages a corresponding surface 1044 of the contact element 1002 to establish electrical communication and physical contact. Electrical current associated with transferred arc operation of the torch 1020 passes between the electrode body 1022 and the contact element 1002.

Figure 11B:
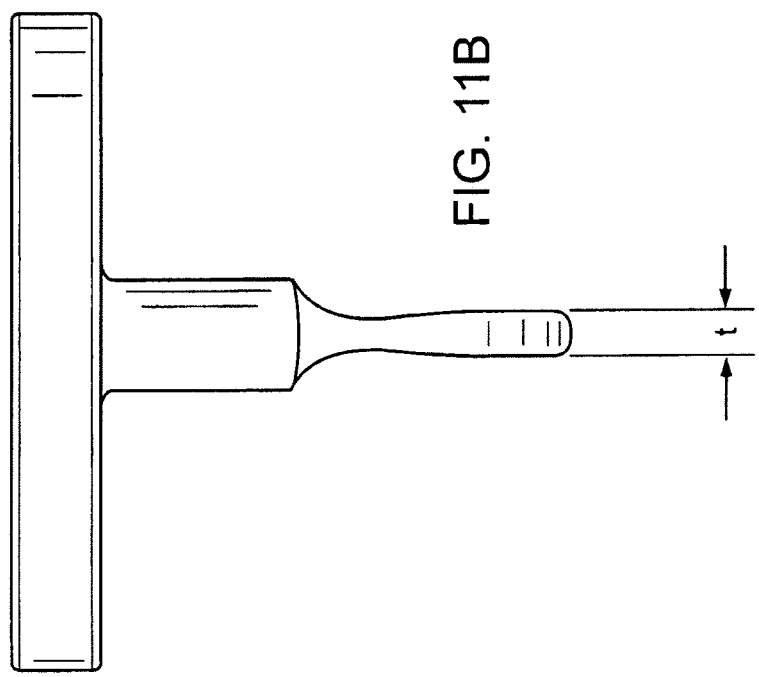
FIG. 11B depicts the contact element of FIG. 11A rotated 90° about a vertical axis.
Figure 11A:
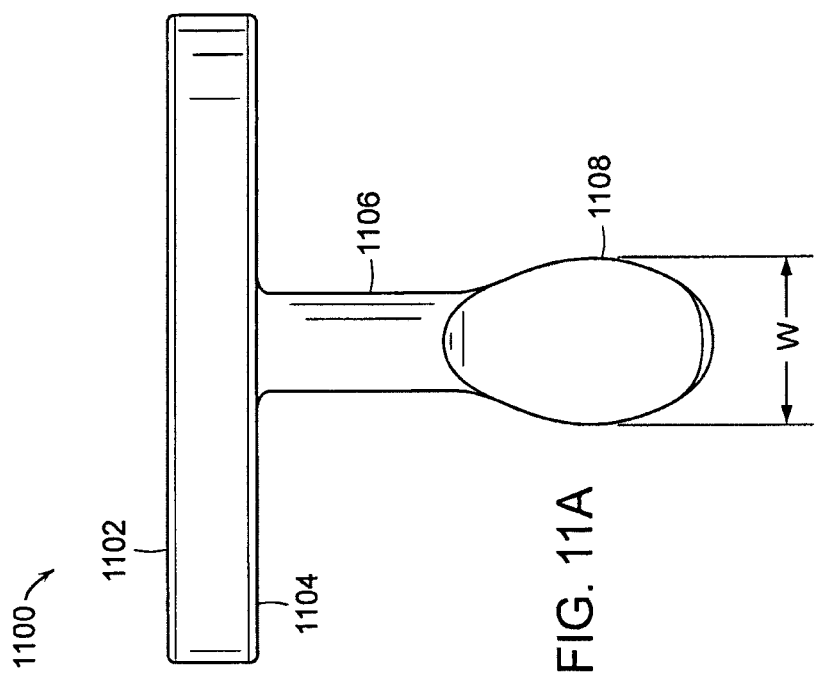
FIG. 11A depicts an exemplary contact element for use in a contact start plasma arc torch.

FIG. 11A depicts an exemplary contact element for use in a contact start plasma arc torch. The contact element 1100 includes a first surface 1102, a second surface 1104, an extensive portion 1106 and a restraining portion 1108. The first surface 1102 is configured for electrical communication with a power contact of a plasma arc torch (not shown). For example, electrical communication can be established by physical contact with a corresponding surface (not shown) of the power contact. The second surface 1104 is configured for electrical communication with an electrode body (not shown), a resilient conductive element, or both. For example, electrical communication can be established with the electrode body by physical contact between the second surface 1104 and a corresponding surface of the electrode body. In some embodiments, physical contact between the power contact and the first surface 1102 and physical contact between the electrode body and the second surface establishes a path for current to flow between the power contact (e.g., the power supply) and the electrode body.

The extensive portion 1106 of the contact element is adjacent the restraining portion 1108. In some embodiments, the extensive portion and the restraining portion are formed integrally (e.g., from the same material). The extensive portion 1106 protrudes orthogonally from the second surface 1104. As depicted, the extensive portion 1106 defines a circular cross-section having a diameter, but other geometries are possible. The width w of the restraining portion 1108 exceeds the diameter of the extensive portion 1106, and the thickness t of the restraining portion 1108 is less than the diameter.

FIG. 11B depicts the contact element of FIG. 11A rotated 90° about a vertical axis. In some embodiments, the restraining portion 1108 and the extensive portion 1106 are advanced into a receptacle of an electrode body (not shown) in a first orientation such as that of FIG. 11B. An opening adjacent the receptacle is dimensioned to permit the restraining portion 1108 and the extensive portion 1106 to enter the receptacle. However, rotating the contact element 1100 about a vertical axis (e.g., as depicted in FIG. 1A), positions the contact element 1100 such that the restraining portion 1108 reacts against a portion of the receptacle to hinder disengagement of the contact element from the electrode body. The contact element 1100 can be secured to an electrode body in other ways, for example, by threading or by an interference fit.

Figure 12A:
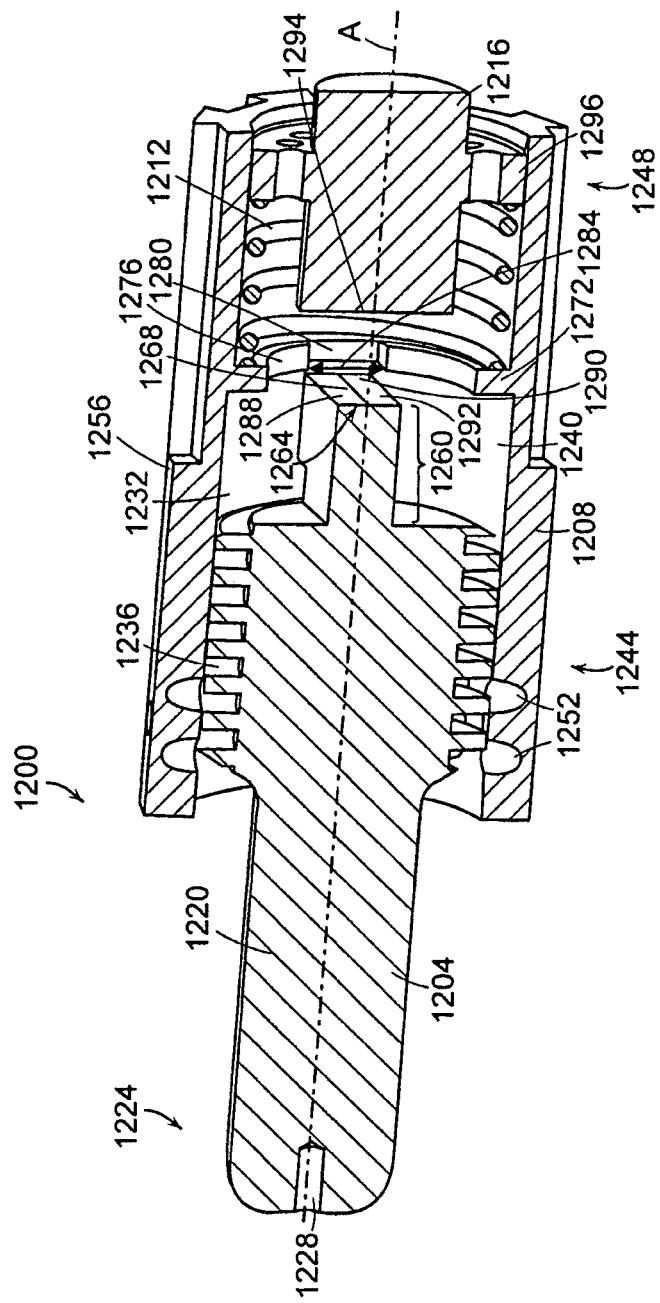
FIG. 12A is a cross-sectional partial perspective view of an assembly for a contact start plasma arc torch.

FIG. 12A is a cross-sectional partial perspective view of an assembly 1200 for a contact start plasma arc torch. The assembly 1200 includes an electrode 1204, a hollow body 1208, a resilient element 1212, and a power contact 1216. The electrode 1204 includes an electrode body 1220 including a distal end 1224 for housing an emissive element 1228. The electrode 1204 also includes an end 1232 positioned remotely from the distal end 1224. The end 1232 is positioned relative to the distal end 1224 (e.g., adjacent the electrode body 1220). The electrode body 1220 includes a set of spiral-shaped grooves 1236 for directing gas flow or facilitating cooling of the assembly 1200. The electrode 1204 can move along axis A when the assembly 1200 is installed within a torch (not shown), for example, to slideably engage an interior surface 1240 of the hollow body 1208. The hollow body 1208 includes a front portion 1244 and a rear portion 1248. In one embodiment, the front portion 1244 includes one or more holes 1252 from an exterior surface 1256 to the interior surface 1240. The holes 1252 can impart a swirling motion relative to the axis A to a gas flowing through the assembly 1200. A hollow body 1208 having such holes 1252 for generating a swirl gas flow is commonly referred to as a swirl ring. It should be recognized that a swirl ring is simply a variation of a hollow body 1208 and the system disclosed herein is capable of function in the hollow body 1208 or swirl ring configuration. It should also be recognized that the hollow body may be an integrally formed portion of a torch.

The end 1232 of the electrode 1204 includes a portion 1260 that extends axially along axis A. The portion 1260 includes a first length 1264 (or distance) along a first direction (e.g., radially away from the axis A) and a second length 1268 (or distance) along a second direction (e.g., radially away from the axis A and perpendicular to the first direction). The hollow body 1208 includes a shoulder 1272 disposed relative to the interior surface 1240 (e.g., defined on the interior surface 1240). The shoulder 1272 can also be referred to as a contour, step, or flange and can have various geometries relative to the interior surface 1240 (e.g., semicircular, triangular, rectangular, or non-regular polygonal geometries). The shoulder 1272 defines a first portion 1276 and a second portion 1280. The first portion 1276 and the second portion 1280 cooperate to form a contoured opening through which the portion 1260 of the electrode 1240 can move. More specifically, the second portion 1280 is located at a distance from the axis A sufficient to facilitate slideable passage of the second length 1268 therethrough. The first portion 1276 cooperates with the second portion 1280 to define an opening having a slot 1284 of sufficiently greater size than the first length 1264 to facilitate slideable passage of the first length 1264 therethrough. The electrode 1204 is installed within the torch in the hollow body 1208 such that the portion 1260 can move axially along axis A and reciprocatingly through the opening defined by the first portion 1276 and the second portion 1280.

The portion 1260 also includes a surface 1288 that includes a first region 1290 for electrical communication with the resilient element 1212 and a second region 1292 for electrical communication with the power contact 1216, e.g., via physical contact with a corresponding surface 1294 of the power contact 1216. The resilient element 1212 resiliently urges the electrode 1204 toward the distal end 1224. The electrode 1204 is hindered from being ejected from the torch by a nozzle (not shown) that is in physical contact with the distal end 1224 when the nozzle is installed. The nozzle is secured to the torch so that the portion 1260 (e.g., via the first region 1290) is in physical contact with the resilient element 1212. For example, installing the nozzle urges the portion 1260 through the slot 1284 and positions the first region 1290 in physical contact with the resilient element 1212. When the nozzle is installed, the resilient element is compressed.

The resilient element 1212 is positioned between the shoulder 1272 and a flange 1296 of the power contact 1216. The resilient element 1212 is retained or captured between the hollow body 1208 (e.g., via the shoulder 1272) and the power contact 1216 (e.g., via the flange 1296). The shoulder 1272 thus retains the resilient element 1212 and facilitates access by the electrode 1204 to the resilient element 1212 and the power contact 1216.

The power contact 1216 is in electrical communication with a power supply (not shown). During pilot arc initiation, the power supply provides a pilot arc current to the power contact 1216, and the current flows from the flange 1296 through the resilient element 1212 to the first region 1290 of the electrode 1204. A plasma gas (not shown) flows about the electrode during pilot arc initiation, and the plasma gas increases fluid pressure on the electrode 1204. The pressure moves the electrode 1204 axially toward the power contact 1216 and into physical contact. Physical separation of the electrode 1204 and the nozzle generates a pilot arc in a plasma chamber (not shown) formed between the nozzle and the electrode 1204. Pressure moves the electrode 1204 into physical contact and electrical communication with the power contact 1216 for transferred arc operation. When the electrode 1204 is in contact with the power contact, the portion 1260 is disposed within the slot 1284.

During transferred arc operation, transferred arc current flows from the power supply through the power contact 1216 to the electrode 1204 via the physical contact between the second region 1292 of the surface 1288 of the portion 1260 and the corresponding surface 1294 of the power contact 1216. Gas pressure is increased during transferred arc operation to form a plasma jet for processing a workpiece (not shown).

Although the assembly 1200 is illustrated for the first region 1290 to physically contact the resilient element 1212 directly, other configurations are possible. For example, the resilient element 1212 can include a separate contact surface (not shown), such as an annular, washer-like plate, secured to the resilient element 1212 for physical contact and electrical communication with the electrode 1204. Similarly, the corresponding surface 1294 of the power contact 1216 can be plated or coated with a material such that the electrode 1204 is in contact with the plate or coating rather than the power contact 1216 itself. Such configurations are within the scope of the invention.

In some embodiments, the front portion 1244 and the rear portion 1248 of the hollow body 1208 are integrally formed (e.g., manufactured from the same piece of material). In some embodiments, the front portion 1244 and the rear portion 1248 are formed of different materials, for example, the front portion 1244 can be made from an insulative material, and the rear portion 1248 can be made from a conductive material.

In some embodiments, the slot 1284 has a dimension or size that is substantially greater than the first length 1264 to facilitate some angular displacement of the electrode 1204 about the axis A within the hollow body 1208 (e.g., while the portion 1260 is disposed within the slot 1284). The slot 1284 can also resist angular displacement of the electrode 1204 about the axis A, for example, by reacting against the portion 1260 to hinder angular displacement. In some embodiments, the first region 1290 and the second region 1292 of the surface 1288 are not co-planar or do not form regions of the same surface. For example, the first region 1290 can be positioned axially remote from the second region 1292, such that the portion 1260 of the electrode 1204 includes an axial step, flange, or shoulder (not shown).

Figure 12B:
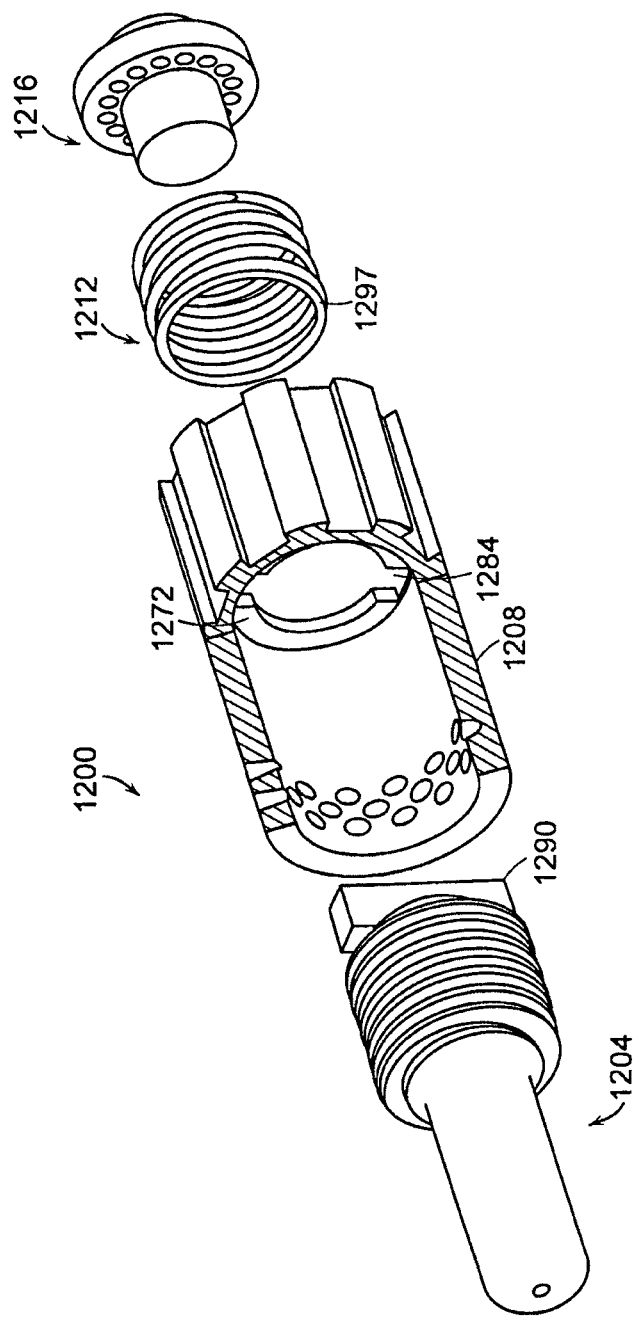
FIG. 12B is an exploded perspective view of the assembly of FIG. 12A.

FIG. 12B is an exploded perspective view of the assembly 1200 of FIG. 12A with a portion of the hollow body 1208 cut away. The view of FIG. 12B illustrates the electrode 1204, the hollow body 1208, the resilient element 1212, and the power contact 1216 in an unassembled configuration before installation in a plasma arc torch (not shown). During assembly, the electrode 1204 slideably engages the hollow body 1208, such that no threads are needed to attach the electrode 1204 to the hollow body 1208. A surface 1297 of the resilient element 1212 is illustrated. The surface 1297 is in contact with the shoulder 1272 of the hollow body 1208 when the resilient element 1212 is positioned within the torch. The first region 1290 is moved through the slot 1284 and into physical contact and electrical communication with at least a portion of the surface 1297 of the resilient element 1212.

Figure 12C:
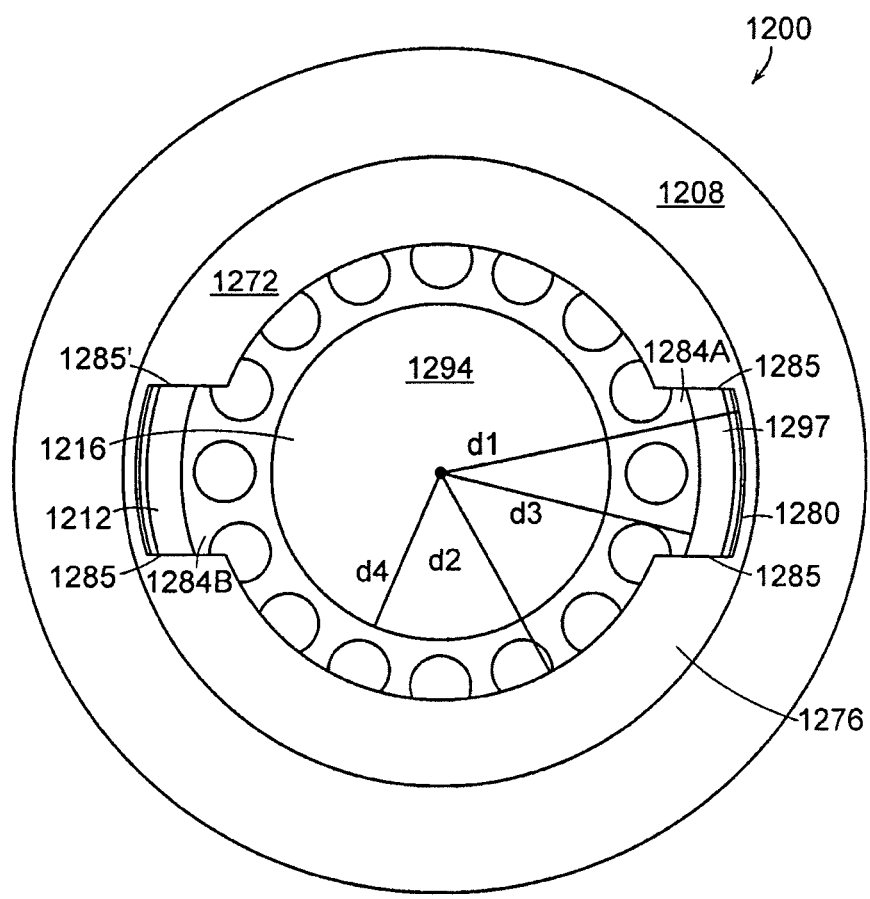
FIG. 12C is an elevational view of a portion of the assembly of FIG. 12A.

FIG. 12C is an elevational view of a portion of the assembly 1200 of FIG. 12A. FIG. 12C depicts the hollow body 1208, the power contact 1216, and the surface 1297 of the resilient element 1212. The electrode 1204 is not shown, but reference is made to various features of the electrode 1204 as depicted in FIG. 12A. The hollow body 1208 includes the shoulder 1272. The shoulder 1272 defines a first portion 1276 and a second portion 1280 that cooperate to form a contoured opening through which the portion 1260 of the electrode 1204 can move. As depicted, the first portion 1276 and second portion 1280 cooperate to form the slots 1284A and 1284B in the opening through which the portion 1260 of the electrode 1204 can move (e.g., by reciprocatingly sliding) when the electrode 1204 is installed in the torch. In such a configuration, the slots 1284A and 1284B in the hollow body 1208 have a complimentary shape to the shape of the portion 1260 of the electrode. The shape of the slots 1284A and 1284B are complimentary in that they are shaped to receive the portion 1260 of the electrode. However, the shape of the slots 1284A and 1284B need not match the shape of the portion 1260 of the electrode. Instead, the shape of the slots 1284A and 1284B need only be capable of allowing clearance of the portion 1260 of the electrode.

In some embodiments, the first portion 1276 and the second portion 1280 cooperate to form a contoured opening having one slot 1284A or 1284B, but not both. Each of the slots 1284A and 1284B are defined by two portions 1285 that are parallel to each other. The portions 1285 can also define other geometries or orientations, for example, the portions 1285 can be radially directed relative to the axis A (e.g., to form a triangular slot 1284). The portions 1285 can also be circular, semicircular, or otherwise curved. In general, the portions 1285 can define any geometry that permits the portion 1260 of the electrode to pass through the shoulder 1272 (e.g., through the opening defined by the first portion 1276 and the second portion 1280).

The distance $d_1$ from the axis A to the second portion 1280 is greater than the distance $d_2$ from the axis A to the first portion 1276. The distance $d_3$ from the axis A to the resilient element 1212 is greater than the distance $d_2$ and less than the distance $d_1$. In some embodiments, the distance $d_3$ can be less than the distance $d_2$ (e.g., when an annular plate (not shown) is secured to the resilient element 1212). The distance $d_4$ from the axis A to the power contact 1216 is less than the distance $d_3$ to facilitate passage of the second region 1292 through the resilient element 1212 and into physical contact and electrical communication with the corresponding surface 1294 of the power contact 1216.

In some embodiments, the electrode 1204 does not move past the shoulder, for example, when the portion 1260 and the slots 1284A and 1284B are not aligned. In such configurations, the portion 1260 contacts the shoulder 1272, which resists passage of the portion 1260 therethrough. In some embodiments, the electrode 1204 can be securely positioned within the torch. For example, the portion 1260 can be passed entirely through the shoulder 1272 into contact with the resilient element 1212 (e.g., via the first region 1290). The portion 1260 compresses the resilient element 1212. The resilient element 1212 urges the electrode 1204 toward the distal end 1224. Upon angular displacement of the portion 1260 about the axis A, a proximal surface (not shown) of the shoulder 1272 resists distal movement of the electrode 1204. The interaction between the portion 1260 and the proximal surface of the shoulder 1272 prevents the resilient element 1212 from ejecting the electrode 1204 from the hollow body 1208 and/or the torch.

In some embodiments, the portion 1260 has a circular configuration centered about the axis A. In such embodiments, the portion 1260 includes a first region 1290 (e.g., an annular outer perimeter of the circular configuration) for physical contact and electrical communication with the resilient element 1212 and a second region 1292 (e.g., a region disposed within the annular outer perimeter) for electrical communication and physical contact with the power contact 1216. As discussed above, the first region 1290 and the second region 1292 can be co-planar (e.g., portions of the same surface) or non-co-planar (e.g., portions of different surfaces). In an alternative embodiment, the first region 1290 can be a separate radial extensive portion (not shown) positioned along the length of the longitudinal axis A of the electrode 1204, such as a pin extending radially through the electrode 1204. The radial extensive portion functions in the same manner as the first region 1290, by providing a mechanism for electrically coupling the electrode 1204 to a resilient element 1212 for conducting a pilot arc. In one embodiment, the radial extensive portion is an elongated shoulder or a pin that can pass through shoulder 1272, while still allowing the resilient element 1212 to be maintained within the hollow body 1208. In such an embodiment, the shoulder 1272 is positioned further down the axial length of the hollow body 1208 towards the distal end of the electrode.

Figure 13A:
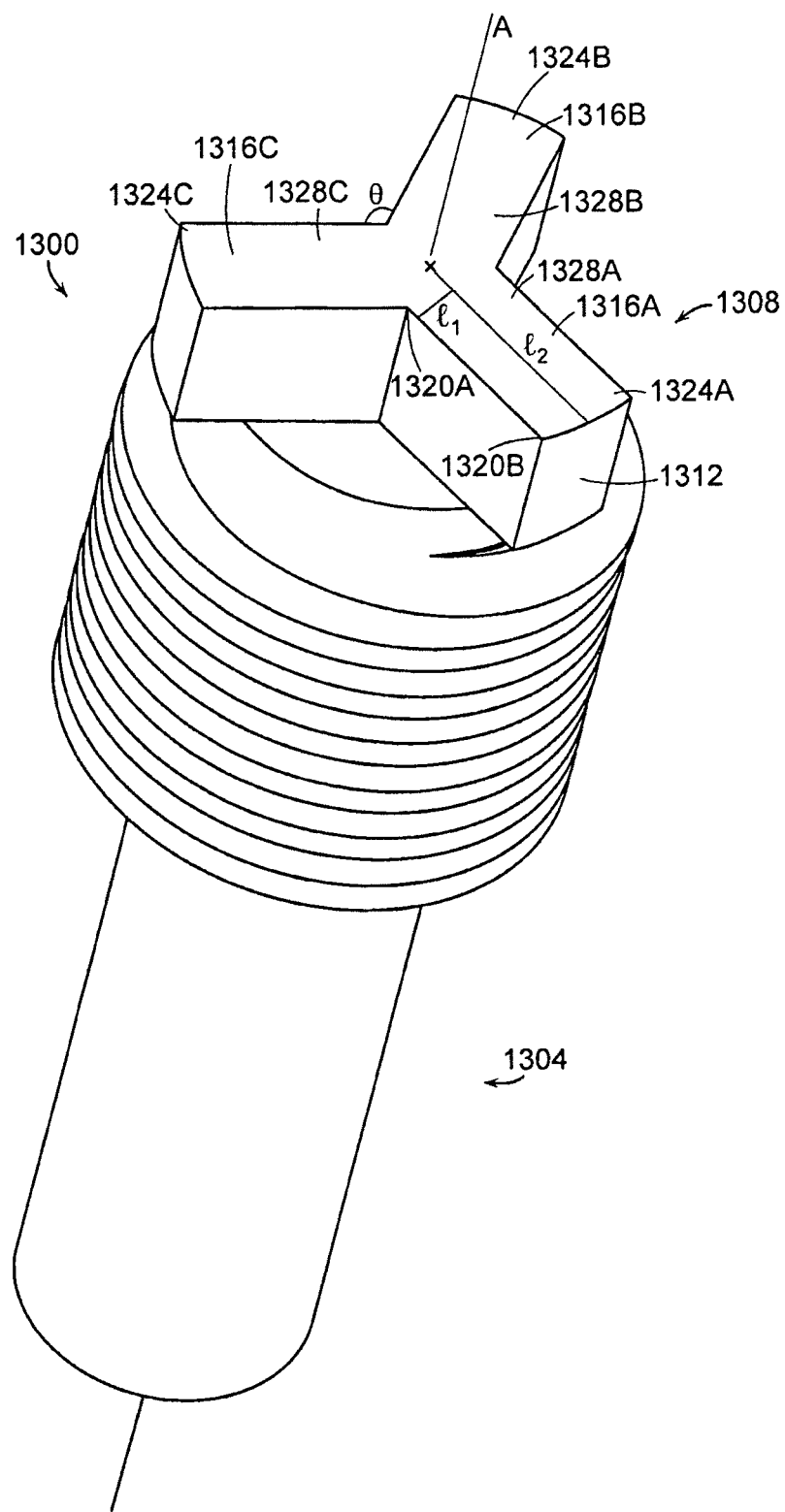
FIG. 13A is a perspective view of an electrode for a contact start plasma arc torch.

FIG. 13A is a perspective view of an electrode 1300 for a contact start plasma arc torch. The electrode 1300 is similar to the electrode 1204 depicted in FIG. 12A. The electrode includes a distal end 1304 and a second end 1308. The second end 1308 includes an extensive portion 1312 that extends axially along the axis A. The extensive portion 1312 defines three portions 1316A, 1316B, and 1316C (also called "fins"), all of which extend away from the axis A. Each of the three portions 1316A, 1316B, and 1316C define a first length $l_1$ and a second length $l_2$ that is greater than the first length $l_1$. In some embodiments, the values for the first length $l_1$ and second length $l_2$ of each of the three portions 1316A, 1316B, and 1316C are the same. The values for the first length $l_1$ and the second length $l_2$ can also be different for each of the three portions 1316A, 1316B, and 1316C. The lengths $l_1$ and $l_2$ are depicted as directed perpendicularly to each other. In some embodiments, the lengths $l_1$ and $l_2$ can be directed in other configurations, for example, radially away from the axis A towards points 1320A and 1320B respectively. Other directions for the lengths $l_1$ and $l_2$ are also possible.

As depicted, each of the three portions 1316A, 1316B, and 1316C are disposed about the axis A in an equiangular configuration (e.g., an angle θ between each of the portions 1316A, 1316B, and 1316C is about 120°). However, the three portions 1316A, 1316B, and 1316C can be disposed in other angular configurations about the axis A that are not equiangular.

Each of the three portions 1316A, 1316B, and 1316C include a respective first region 1324A, 1324B, and 1324C for electrical communication and/or physical contact with a corresponding surface (not shown) of a resilient element (not shown). Each of the three portions 1316A, 1316B, and 1316C include a respective second region 1328A, 1328B, and 1328C for electrical communication and/or physical contact with a corresponding surface (not shown) of a power contact (not shown).

As depicted, the first region 1324A, 1324B, and 1324C of each portion 1316A, 1316B, and 1316C is depicted as coplanar with the respective second portion 1328A, 1328B, and 1328C. In some embodiments, the first region 1324A, 1324B, and 1324C is not coplanar with the respective second region 1328A, 1328B, and 1328C. In some embodiments, the second regions 1328A, 1328B, and 1328C are not coplanar with each other second region. In some embodiments, a subset of the three portions, e.g., 1316A and 1316B, are in electrical communication with the resilient element, and the other portions, e.g., 1316C, is not in electrical communication with the resilient element. The portions, e.g., 1316C, not in electrical communication with the resilient element can provide aligning features or increased surface area to improve cooling the electrode. The portion 1316C can still be moved into physical contact and electrical communication with the power contact during transferred arc operation. In some embodiments, the first region 1324A, 1324B, and 1324C or the second region 1328A, 1328B, and 1328C, or both, can coincide with the extensive portion 1312. For example, pilot current and/or transferred arc current can flow between a power supply and the electrode 1300 via electrical communication with the extensive portion 1312 (e.g., via a sliding electrical contact discussed above).

Figure 13B:
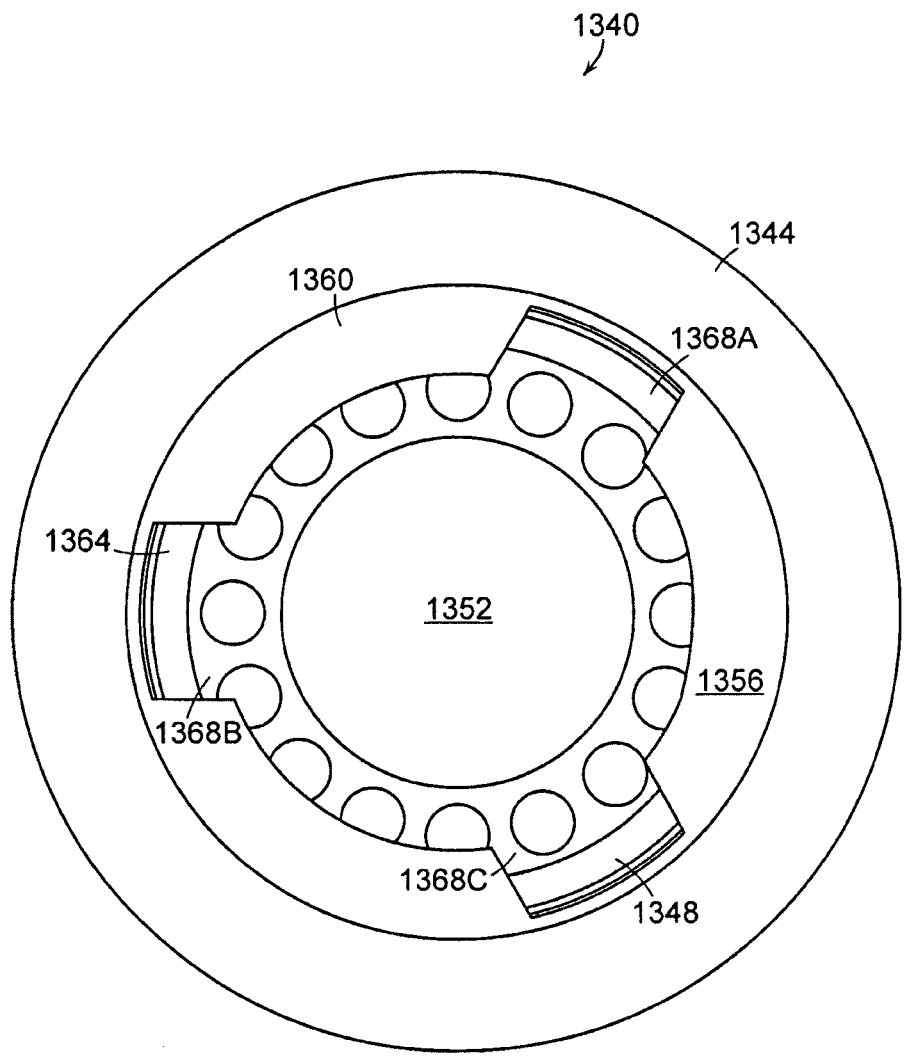
FIG. 13B is an elevational view of an assembly for use with the electrode of FIG. 13A.

FIG. 13B is an elevational view of an assembly 1340 for use with the electrode 1300 of FIG. 13A. The assembly 1340 includes a hollow body 1344, a resilient element 1348, and a power contact 1352. The assembly is similar to the assembly 1200 depicted in FIG. 12C. The assembly 1340 is configured for use with the electrode 1300 of FIG. 13A. More specifically, hollow body 1344 includes a shoulder 1356 that has a first portion 1360 and a second portion 1364 that cooperate to form a contoured opening having three slots 1368A, 1368B, and 1368C. The opening and the three slots 1368A, 1368B, and 1368C facilitate movement of the corresponding portions 1316A, 1316B, and 1316C through the opening and into physical contact and electrical communication with the resilient element 1348. As discussed above, the size of slots 1368A, 1368B, and 1368C is depicted as approximately the same size as the portions 1316A, 1316B, and 1316C; however, the slots 1368A, 1368B, and 1368C can be larger (e.g., circumferentially larger) than the corresponding portions 1316A, 1316B, and 1316C.

FIGS. 14A-14B, 15A-15B, and 16 depict alternative embodiments of electrodes and assemblies that operate similarly to those described above.

Figure 14A:
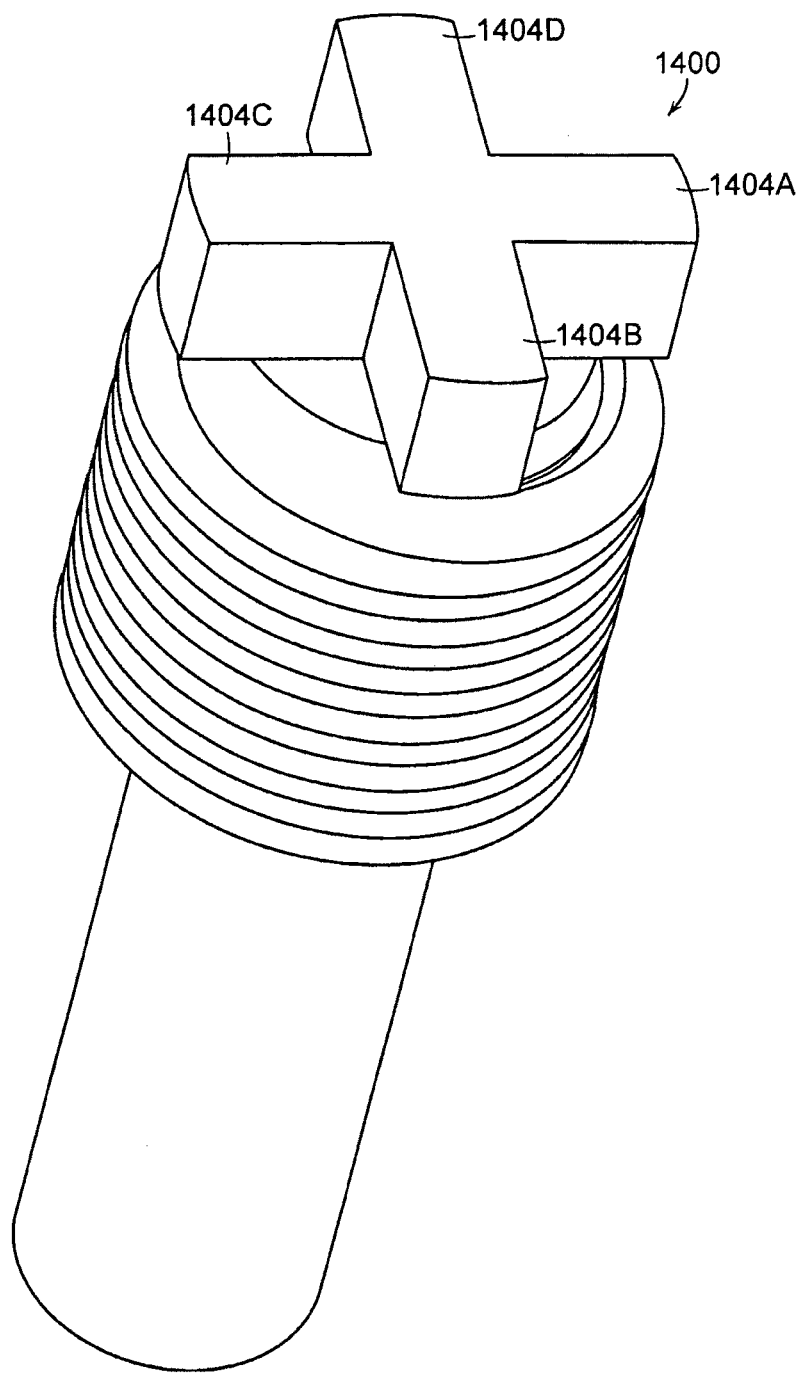
FIG. 14A is a perspective view of an electrode for a contact start plasma arc torch.

FIG. 14A is a perspective view of an electrode 1400 for a contact start plasma arc torch. The electrode 1400 includes four portions 1404A, 1404B, 1404C, and 1404D.

Figure 14B:
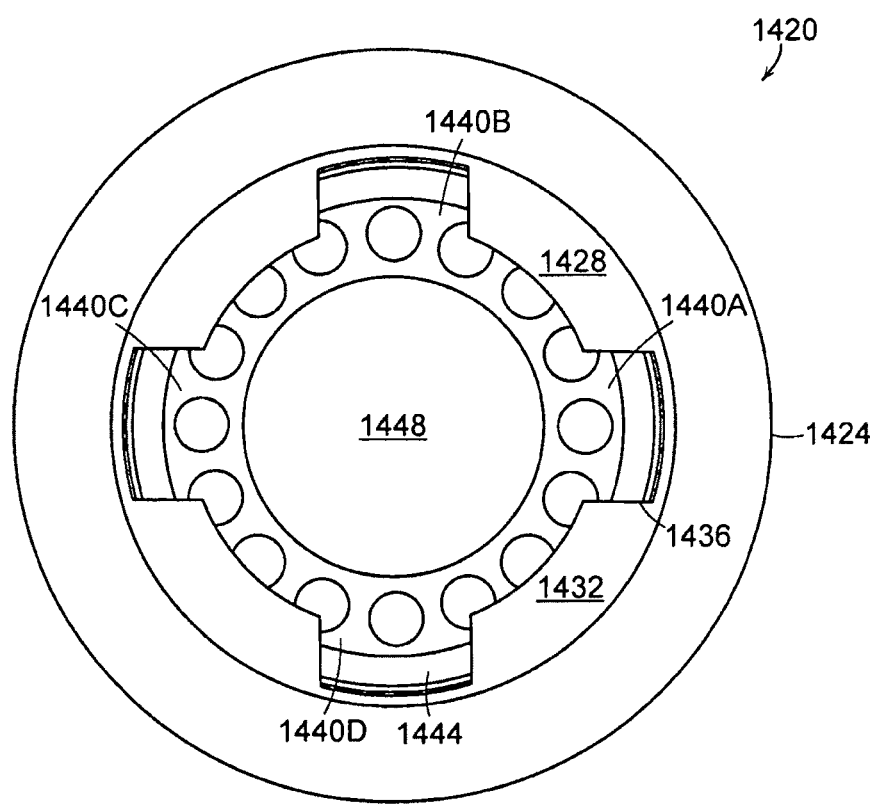
FIG. 14B is an elevational view of an assembly for use with the electrode of FIG. 14A.

FIG. 14B is an elevational view of an assembly 1420 for use with the electrode 1400 of FIG. 14A. The assembly 1420 includes a hollow body 1424 including a shoulder 1428 with a first portion 1432 and a second portion 1436 defining an contoured opening with four slots 1440A, 1440B, 1440C, and 1440D to facilitate passage of the four corresponding portions 1404A, 1404B, 1404C, and 1404D through the contoured opening and into physical contact and/or electrical communication with the resilient element 1444 and the power contact 1448.

Figure 15A:
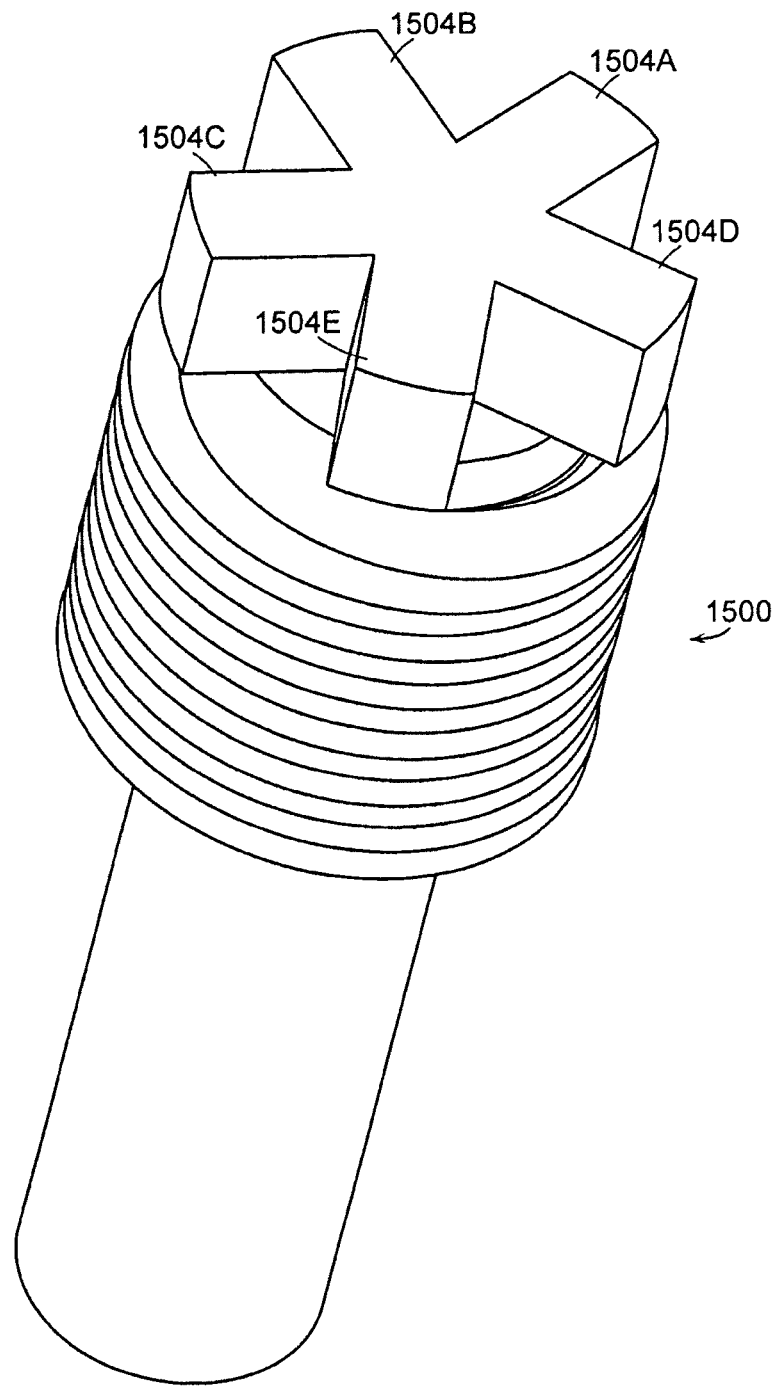
FIG. 15A is a perspective view of an electrode for a contact start plasma arc torch.

FIG. 15A is a perspective view of an electrode 1500 for a contact start plasma arc torch. The electrode 1500 includes five portions 1504A, 1504B, 1504C, 1504D, and 1504E.

Figure 15B:
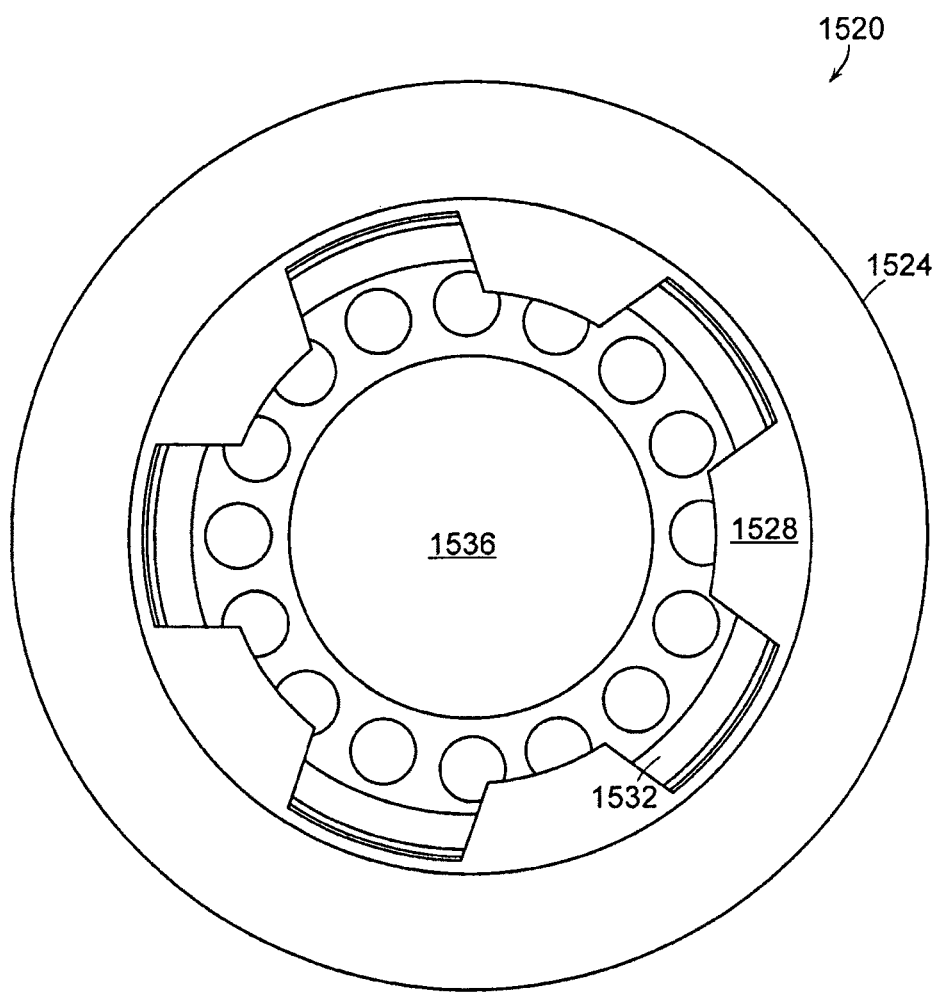
FIG. 15B is an elevational view of an assembly for use with the electrode of FIG. 15A.

FIG. 15B is an elevational view of an assembly 1520 for use with the electrode 1500 of FIG. 15A. The assembly 1520 includes a hollow body 1524 including a shoulder 1528 defining a contoured opening to facilitate passage of the five corresponding portions 1504A, 1504B, 1504C, 1504D, and 1504E through the contoured opening and into physical contact and/or electrical communication with a resilient element 1532 and power contact 1536. The electrode 1500 can be used in a manner similar to that described above for the electrode 1204 of FIG. 12A, electrode 1300 of FIG. 13A, and the electrode 1400 of FIG. 14A.

A value for the operational current of the plasma arc torch can be related or associated with the number of portions (e.g., the three portions 1316A-1316C of FIG. 13A, the four portions 1404A-1404D of FIG. 14A, or the five portions 1504A-1504E of FIG. 15A) that a particular electrode includes. For example, an electrode with the three portions 1316A-1316C can be used in a torch operating at about 60 Amps during transferred arc operation. An electrode with four portions 1404A-1404D can be used in a torch operating at about 80 Amps during transferred arc operation. An electrode with five portions 1504A-1504E can be used in a torch operating at about 100 Amps during transferred arc operation. Electrodes employing the designs depicted in FIGS. 13A, 14A, and 15A can be used in torches configured with a contoured opening as depicted in FIGS. 13B, 14B, and 15B, respectively. In some embodiments, an electrode can include more than five portions.

By correlating the number of fins to the torch operating current, the usage of the correct electrode for a given operating current of the torch can be assured. By way of example, in the operation of a 60-Amp torch, the use of a hollow body 1344 with three slots 1368A, 1368B, and 1368C will receive a 60-Amp electrode with a corresponding number of portions (or "fins"), e.g., the three portions 1316A-1316C. On the other hand, if a user attempts to use a 100-Amp electrode, e.g., an electrode 1500 with five portions 1504A-1504E, in an 60-Amp torch configured with the three slots 1368A, 1368B, and 1368C, the electrode 1500 and the hollow body 1344 would not mate. The five portions 1504A-1504E are hindered from passing through the three slots 1368A-1368C. By employing such a system, the particular torch can be optimized for a particular electrode. In some embodiments, a user is thus prevented from using an electrode with five fins (e.g., the electrode 1500) with a torch that is not optimized for that electrode (e.g., a torch having three slots 1368A-1368C). Moreover, an electrode (e.g., the electrode 1300) having fewer fins (e.g., three portions 1316A-1316-C) is hindered from use with a torch employing more slots (e.g., the five slots of the hollow body 1524), which increases the operational of life of the electrode by optimizing the amount of current flowing through the electrode.

Figure 16:
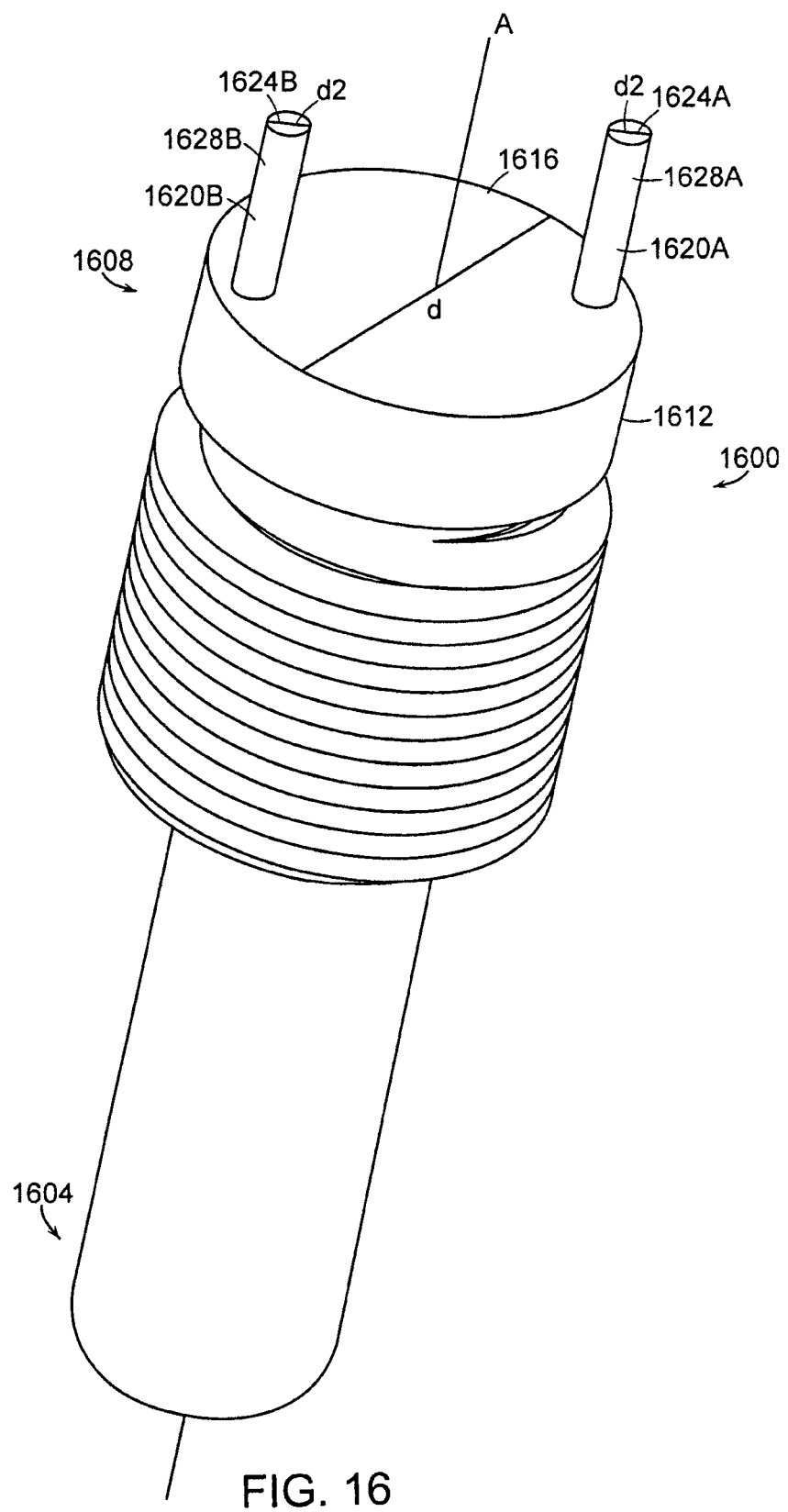
FIG. 16 is a perspective view of an electrode for a contact start plasma arc torch.

FIG. 16 is a perspective view of an electrode 1600 for a contact start plasma arc torch. The electrode 1600 includes a distal end 1604 and a second end 1608. The second end 1608 includes an extensive portion 1612 that defines a surface 1616 having diameter $d_1$. Two regions 1620A and 1620B extend from the surface 1616 along an axis A. The regions 1620A and 1620B each define a respective end surface 1624A and 1624B. The end surfaces 1624A and 1624B can be used for physical contact and electrical communication with a corresponding surface of a resilient element (e.g., the surface 1297 of the resilient element 1212 of FIG. 12C). Current for pilot arc initiation flows between the resilient element (not shown) and the electrode 1600 via the surfaces 1624A and 1624B and the regions 1620A and 1620B. As the electrode 1600 is moved in a proximal direction (e.g., away from the distal end 1604) during pilot arc initiation, the regions 1620A and 1620B compress the resilient element. The surface 1616 is moved into physical contact and electrical communication with a corresponding surface (not shown) of a power contact (not shown), such as the surface 1294 of the power contact 1216 of FIG. 12A for transferred arc operation.

The regions 1620A and 1620B also define respective extensive surfaces 1628A and 1628B. The regions 1620A and 1620B can pass through the slots 1284A and 1284B of FIG. 12C (e.g., the slots 1284A and 1284B defined by the first portion 1276 and the second portion 1280 of the shoulder 1272). The extensive portions 1628A and 1628B can react against the slots 1284A and 1284B to hinder or resist angular displacement of the electrode 1600 about the axis A within the torch. As depicted, the regions 1620A and 1620B substantially parallel to the axis A. Other configurations or alignments of the regions 1620A and 1620B can be used. Each of the regions 1620A and 1620B defines a diameter $d_2$ that is smaller than the diameter $d_1$.

In some embodiments, a second extensive portion (not shown) extends from the surface 1616 and defines a second surface (not shown). The second surface can be parallel to the surface 1616. The second extensive portion can extend distally (e.g., towards the distal end 1604) to define a cavity (not shown) within the second end 1608 relative to the surface 1616. The second extensive portion can extend proximally (e.g., away from the distal end 1604) to define a cylindrical or pedestal-like portion (not shown). In such embodiments, the second surface can be moved into physical contact and electrical communication with a corresponding surface of the power contact for transferred arc operation.

The regions 1620A and 1620B are disposed diametrally opposite each other and equidistant from the axis A. In some embodiments, the electrode 1600 includes more than two regions 1620A and 1620B (e.g., three, four, or five regions, for use with the assemblies 1340, 1420, and 1520 of FIGS. 13B, 14B, and 15B, respectively). In some embodiments, the electrode 1600 includes only one region 1620A or 1620B. In such embodiments, the region 1620A or 1620B can be parallel or aligned with the axis A. The shoulder (e.g., the shoulder 1272) can define an opening having a substantially continuous circumference (e.g., without the slot 1284) in such an embodiment. The diameter of the opening can be smaller than an outer diameter of the resilient element and larger than an inner diameter of the resilient element to hinder removal of the resilient element from the torch. The region 1620A or 1620B defines a diameter smaller than the diameter of the opening but larger than the inner diameter of the resilient element to facilitate contact between the region 1620A or 1620B and the resilient element.

While the invention has been particularly shown and described with reference to specific embodiments, it should be understood by those skilled in the art that various changes in form and detail may be made therein without departing from the spirit and scope of the invention as defined by the appended claims. For example, while some surfaces have been depicted as planar, surfaces having other, non-planar geometries, such as, spherical, hemispherical, conical, and/or cylindrical geometries may be used without departing from the spirit and the scope of the invention.

What is claimed is:

1. An electrode for a contact start plasma arc torch in electrical communication with a power supply, the electrode being movable relative to a nozzle within a plasma chamber of the torch, the electrode comprising:

an elongated electrode body formed of an electrically conductive material, the electrode body defining a longitudinal axis; and a resilient element contacting a proximal end of the electrode body and imparting a separation force to the electrode body, wherein the electrode body is adapted to overcome the separation force and engage a contact element of the torch when the torch is operated in a transferred arc mode.

2. The electrode of claim 1, wherein the electrode body further comprises a reaction surface disposed in a spaced relationship relative to the proximal end of the electrode body, wherein the reaction surface is configured for electrical communication with the resilient element.

3. The electrode of claim 2, wherein the reaction surface comprises a radially extending flange formed integrally with the electrode body.

4. The electrode of claim 1, wherein the resilient element is secured relative to the proximal end of the electrode body.

5. The electrode of claim 1, wherein the resilient element is secured by a diametral interference fit.

6. The electrode of claim 1, wherein the resilient element is formed integrally with the electrode body.

7. The electrode of claim 1, further comprising a hollow body for maintaining the resilient element and slideably receiving the electrode body.

8. The electrode of claim 7, wherein the hollow body is a swirl ring.

9. The electrode of claim 1, wherein the contact element includes a first surface and a second surface, the first surface facilitating electrical communication with the power supply and the second surface is characterized by physical contact with the electrode body when the torch is operated in the transferred arc mode.

10. The electrode of claim 9, wherein the second surface of the contact element is characterized by absence of physical contact with the electrode body during initiation of a pilot arc.

11. The electrode of claim 9, wherein the contact element further comprises a connective member extending from the second surface to slideably engage the electrode body.

12. The electrode of claim 11, wherein the connective member is formed integrally with the second surface.

13. The electrode of claim 11, wherein the contact element further comprises an aligning portion defining an axis, the aligning portion disposed in a spaced relationship with the proximal end of the electrode body and configured to restrain radial movement of the electrode body.

14. The electrode of claim 11, wherein a portion of the contact element facilitates passage of a pilot arc current between the contact element and the electrode body when the contact element slideably engages the electrode body.

15. The electrode of claim 1, wherein the resilient element passes at least substantially all of a pilot arc current between the power supply and the electrode body.

16. The electrode of claim 1, wherein the resilient element is not electrically conductive.

17. The electrode of claim 16, further comprising a conductive element for passing at least substantially all of a pilot arc current between the power supply and the electrode body.

18. An electrode for a contact start plasma arc torch in electrical communication with a power supply, the electrode being movable relative to a nozzle within a plasma chamber of the torch, the electrode comprising:

an elongated electrode body formed of an electrically conductive material and defining a longitudinal axis, the electrode body comprising:

a first surface characterized by i) physical contact with a contact element when the torch is operated in a transferred arc mode and ii) absence of physical contact with the contact element during initiation of a pilot arc; and a second surface positioned remotely from the first surface, the second surface contacting a resilient element configured to impart a separation force between the electrode body and the contact element.

19. The electrode of claim 18, wherein the contact element comprises an annular configuration.

20. The electrode of claim 18, further comprising a receptacle disposed within the proximal end of the electrode body for receiving at least a portion of the contact element such that a first portion of the contact element is physically remote from the electrode body during initiation of a pilot arc, the first portion for passing at least substantially all of a transferred arc current between the power supply and the electrode body at the first surface when the torch is operated in the transferred arc mode.

21. The electrode of claim 20, wherein the receptacle further comprises:

a cylindrical portion; and a restraint surface disposed at a proximal end of the receptacle for reacting against a portion of the contact element to hinder disengagement of the contact element from the receptacle.

22. The electrode of claim 21, wherein the restraint surface comprises an annular configuration.

23. The electrode of claim 21, wherein the cylindrical portion is defined by a first diameter, the restraint surface comprises a second diameter, and a distal region of a connective member of the contact element defines a third diameter, such that the third diameter is greater than the second diameter and less than the first diameter.

24. The electrode of claim 23, wherein the distal region is a distal end of the connective member.

25. The electrode of claim 20, wherein the resilient element is retained by the electrode body.

26. The electrode of claim 25, wherein the resilient element is retained by a diametral interference fit.

27. The electrode of claim 25, wherein the resilient element is disposed within the receptacle.

28. The electrode of claim 18, wherein the second surface comprises a radially extending flange formed integrally with the electrode body.

29. A contact start plasma arc torch comprising:

a power supply for providing current to the torch;

a plasma chamber defined by a nozzle and an electrically conductive electrode body slideably mounted within the torch and defining a longitudinal axis;

a power contact disposed in a stationary position relative to the plasma chamber, the power contact in electrical communication with the power supply; and a resilient element contacting a proximal end of the electrode body and imparting a separation force to the electrode body, wherein the electrode body is adapted to overcome the separation force and engage the power contact when the torch is operated in a transferred arc mode.

30. The plasma arc torch of claim 29, further comprising a swirl ring that imparts radial motion to a gas flowing through the torch.

31. The plasma arc torch of claim 29, further comprising a shield defining an exit port positioned adjacent an exit orifice of the nozzle, the shield mounted on a retaining cap supported on a torch body of the plasma arc torch.

32. The plasma arc torch of claim 29, wherein the power contact passes at least substantially all of a transferred arc current between the power supply and the electrode body when the torch is operated in the transferred arc mode.

33. The plasma arc torch of claim 29, wherein the resilient element passes at least substantially all of a pilot arc current between the power supply and the electrode body when the torch is operated in a pilot arc mode.

34. The plasma arc torch of claim 29, further comprising a conductive element for passing at least substantially all of a pilot arc current between the power supply and the electrode body when the torch is operated in a pilot arc mode, wherein the resilient element is not electrically conductive.

* * * * *